United States Patent
Hartmann

(10) Patent No.: US 11,200,448 B2
(45) Date of Patent: Dec. 14, 2021

(54) SYSTEMS AND METHODS FOR GENERATING A LOW-DIMENSIONAL SPACE REPRESENTING SIMILARITIES BETWEEN PATENTS

(71) Applicant: RELX Inc., New York, NY (US)

(72) Inventor: Christoph Hartmann, Bonn (DE)

(73) Assignee: RELX INC., New York, NY (US)

( * ) Notice: Subject to any disclaimer, the term of this patent is extended or adjusted under 35 U.S.C. 154(b) by 0 days.

(21) Appl. No.: 16/861,834

(22) Filed: Apr. 29, 2020

(65) Prior Publication Data

US 2020/0364497 A1 Nov. 19, 2020

Related U.S. Application Data

(60) Provisional application No. 62/848,242, filed on May 15, 2019.

(51) Int. Cl.
*G06K 9/62* (2006.01)
*G06Q 50/18* (2012.01)

(52) U.S. Cl.
CPC .......... *G06K 9/6227* (2013.01); *G06K 9/628* (2013.01); *G06K 9/6228* (2013.01); *G06Q 50/184* (2013.01)

(58) Field of Classification Search
CPC .................. G06K 9/6217–6287; G06Q 50/184
See application file for complete search history.

(56) References Cited

U.S. PATENT DOCUMENTS

| | | | |
|---|---|---|---|
| 6,847,966 B1 | 1/2005 | Sommer et al. | |
| 2012/0116989 A1* | 5/2012 | Lai | G06Q 50/184 |
| | | | 705/36 R |

FOREIGN PATENT DOCUMENTS

| | | | |
|---|---|---|---|
| KR | 100849631 B1 * | 2/2008 | ............ G06F 17/15 |
| KR | 1020080011949 | 2/2008 | |
| WO | 2009075554 | 6/2009 | |

OTHER PUBLICATIONS

PCT/US2020/032631 Notification of Transmittal of the International Search Report and The Written Opinion of the International Searching Authority, or the Declaration, dated Aug. 25, 2020.

(Continued)

*Primary Examiner* — Casey L Kretzer
(74) *Attorney, Agent, or Firm* — Dinsmore & Shohl LLP

(57) ABSTRACT

A computing device generates a patent characteristic space including patent vectors having a first number of features. Each of the patent vectors represents a respective patent family of one or more respective patents, and each of the features represents a respective property of the respective patent families represented by the patent vectors. The device performs a linear dimensionality reduction on the patent characteristic space to obtain an intermediate characteristic space that includes the patent vectors having a number of features reduced to a second number of features selected based on the respective properties of the patent families. The device performs a non-linear dimensionality reduction on the intermediate characteristic space to obtain, and present via a user interface according to a visualization preference, a reduced characteristic space that includes the patent vectors having a number of features reduced to a third number of features selected based on the visualization preference.

20 Claims, 16 Drawing Sheets

(56) References Cited

OTHER PUBLICATIONS

Lei Lei et al., "Patent Analytics Based on Feature Vector Space Model: A Case of IoT", arXiv:1904,08100, Apr. 17, 2019, pp. 1-10 [retrieved on Aug. 6, 2020.]. Retrieved from <https://arxiv,org/abs/1904,08100: pp. 1-8.

Seokkyu Choi et al., 'A Deep Patent, Landscaping Model using Transformer and Graph Convolutional Network', arXiv:1903.05823v1, Mar. 14, 2019, pp. 1-7 [retrieved on Aug. 6, 2020.]. Retrieved from <https://arxiv.orgabs/1903.05823v 1>pp. 1-6.

* cited by examiner

Patent Document 320

- Application No. 302
- Title 304
- Inventors 306
- Applicant 308
- Assignee 310
- Filing Date 312

- Patent No. 314
- Classifications 340
- Cited Patents 350
- Priority Patents 360

- Publication No. 322
- Claims 324
- Detailed Description 326
- Background 328
- Abstract 330
- Summary 332

Fig. 3b

|    | f1 | f2 | f3 | f4 | f5 | f6 |
|----|----|----|----|----|----|----|
| p1 | 1  | 0  | 1  | 0  | 0  | 0  |
| p2 | 0  | 1  | 0  | 0  | 0  | 0  |
| p3 | 1  | 1  | 0  | 0  | 0  | 0  |
| p4 | 1  | 0  | 0  | 1  | 1  | 0  |
| p5 | 0  | 0  | 0  | 1  | 0  | 1  |

Fig. 7

|    | 1    | 2     | 3     | 4     | 5     | 6     |
|----|------|-------|-------|-------|-------|-------|
| f1 | 0.75 | -0.29 | -0.28 | 0.    | 0.53  | 0.    |
| f2 | 0.28 | -0.53 | 0.75  | 0.    | -0.29 | 0.    |
| f3 | 0.2  | -0.19 | -0.45 | 0.58  | -0.63 | 0.    |
| f4 | 0.45 | 0.63  | 0.2   | 0.    | -0.19 | -0.58 |
| f5 | 0.33 | 0.22  | -0.12 | -0.58 | -0.41 | 0.58  |
| f6 | 0.12 | 0.41  | 0.33  | 0.58  | 0.22  | 0.58  |

U =

Fig. 10a $$\Sigma = \begin{bmatrix} 2.16 & 0. & 0. & 0. & 0. & 0. \\ 0. & 1.59 & 0. & 0. & 0. & 0. \\ 0. & 0. & 1.28 & 0. & 0. & 0. \\ 0. & 0. & 0. & 1. & 0. & 0. \\ 0. & 0. & 0. & 0. & 0.39 & 0. \\ 0. & 0. & 0. & 0. & 0. & 0. \end{bmatrix}$$

Fig. 10b

|   | p1   | p2    | p3    | p4    | p5    |
|---|------|-------|-------|-------|-------|
| 1 | 0.44 | -0.3  | -0.57 | 0.58  | -0.25 |
| 2 | 0.13 | -0.33 | 0.59  | 0.    | -0.73 |
| 3 | 0.48 | -0.51 | 0.37  | 0.    | 0.61  |
| 4 | 0.7  | 0.35  | -0.15 | -0.58 | -0.16 |
| 5 | 0.26 | 0.65  | 0.41  | 0.58  | 0.09  |

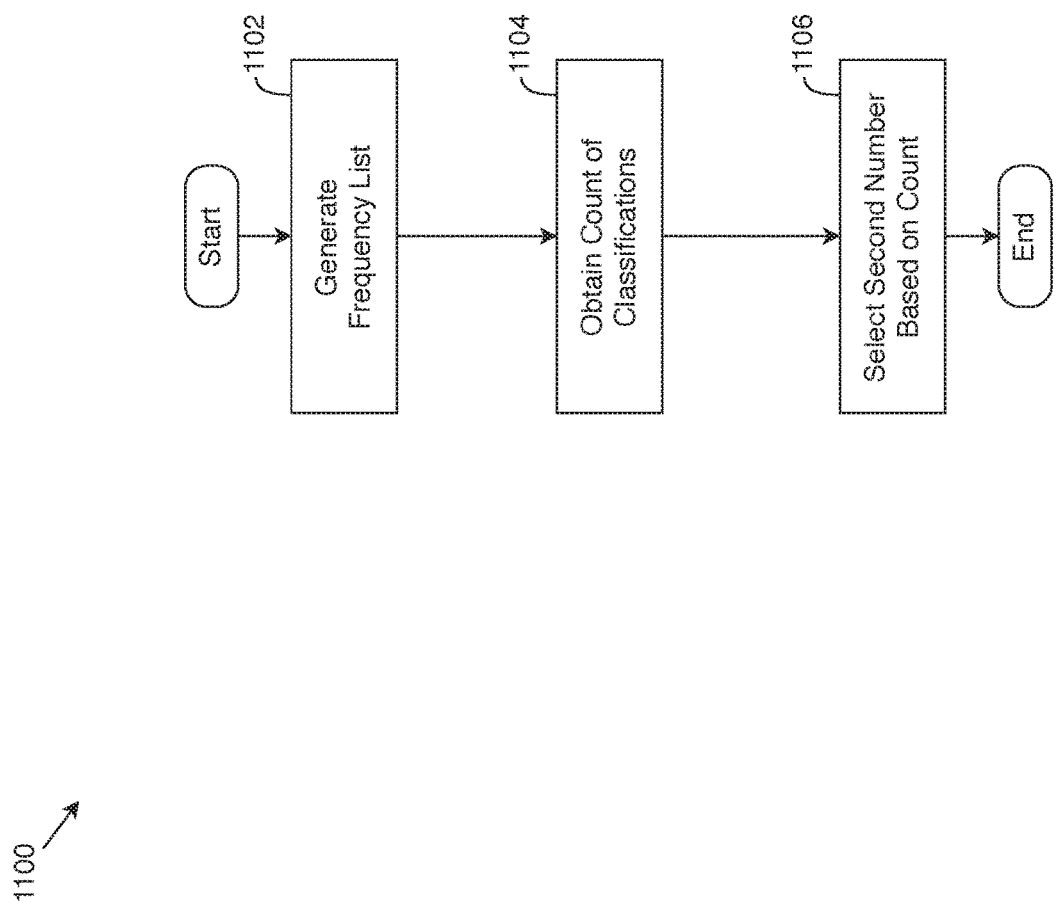

$$\begin{bmatrix} 0. & 1.08 & 1.19 & 1.59 & 1.22 & 1.75 \\ 1.08 & 0. & 0.57 & 1.87 & 1.2 & 1.53 \\ 1.19 & 0.57 & 0. & 1.4 & 0.7 & 0.96 \\ 1.59 & 1.87 & 1.4 & 0. & 0.7 & 0.79 \\ 1.22 & 1.2 & 0.7 & 0.7 & 0. & 0.53 \\ 1.75 & 1.53 & 0.96 & 0.79 & 0.53 & 0. \end{bmatrix}$$

SYSTEMS AND METHODS FOR GENERATING A LOW-DIMENSIONAL SPACE REPRESENTING SIMILARITIES BETWEEN PATENTS

CROSS-REFERENCE TO RELATED APPLICATIONS

This application claims the benefit of U.S. Provisional Application No. 62/848,242, filed May 15, 2019, the entire contents of which are incorporated by reference in their entirety.

TECHNICAL FIELD

The present disclosure generally relates to systems, computing devices, and methods carried out by the systems and devices, and more specifically, to systems, devices, and methods for presenting a visualization of a low-dimensional patent characteristic space that includes representations of one or more patents.

BACKGROUND

Prior to developing or launching a new product, companies often desire an understanding of the opportunities to commercialize the product, which in turn may inform the company's decision whether to proceed with further development of the product. One risk to commercialization is the existence of patents that may be asserted by competitors to block the sale or manufacture of the product. Accordingly, companies of seek an awareness of patents that may pose such a risk.

Identifying relevant patents may prove a daunting task, given the millions of patents currently in force and the numerous potential attributes of each of these patents. One option may be to identify one or more patents germane to a given product, which could then be used to seek out other pertinent patents with attributes having an affinity to those of the identified patents. However, existing systems are unable to identify and convey relationships between patents (and patent attributes) in an efficient and readily understandable manner.

SUMMARY

An embodiment of the present disclosure takes the form of a method that includes generating a patent characteristic space including patent vectors having a first number of features. Each of the patent vectors represents a respective patent family of one or more respective patents, and each of the features represents a respective property of the respective patent families represented by the patent vectors. The method further includes performing a linear dimensionality reduction on the patent characteristic space to obtain an intermediate characteristic space that includes the patent vectors having a number of features reduced to a second number of features selected based on the respective properties of the patent families. The method also includes performing a non-linear dimensionality reduction on the intermediate characteristic space to obtain a reduced characteristic space that includes the patent vectors having a number of features reduced to a third number of features selected based on a visualization preference. The method further includes presenting a visualization of the reduced characteristic space via a user interface according to the visualization preference.

Another embodiment takes the form of a computing device having a processor and a non-transitory computer-readable storage medium that includes instructions. The instructions, when executed by the processor, cause the computing device to generate a patent characteristic space including patent vectors having a first number of features. Each of the patent vectors represents a respective patent family of one or more respective patents, and each of the features represents a respective property of the respective patent families represented by the patent vectors. The instructions further cause the computing device to perform a linear dimensionality reduction on the patent characteristic space to obtain an intermediate characteristic space that includes the patent vectors having a number of features reduced to a second number of features selected based on the respective properties of the patent families. The instructions also cause the computing device to perform a non-linear dimensionality reduction on the intermediate characteristic space to obtain a reduced characteristic space that includes the patent vectors having a number of features reduced to a third number of features selected based on a visualization preference. The instructions further cause the computing device to present a visualization of the reduced characteristic space via a user interface according to the visualization preference.

A further embodiment takes the form of a method that includes generating a patent characteristic space including patent vectors having a first number of features. Each of the patent vectors represents a respective patent family of one or more respective patents, and each of the features represents a respective property of the respective patent families represented by the patent vectors. The method further includes generating a frequency list of patent classifications according to respective frequencies of the patent classifications. The respective frequency of each of the patent classifications in the frequency list takes the form of (or includes) a number of the patent families having at least one patent assigned to the patent classification. Additionally, the method includes obtaining a count of patent classifications in the frequency list having respective frequencies that are no less than a threshold percent of the respective frequency of a patent classification having the highest respective frequency among the patent classifications in the frequency list. The method further includes performing, based on the obtained count of patent classifications, a dimensionality reduction on the patent characteristic space to obtain a low-dimensional characteristic space that includes the patent vectors having a number of features reduced to a second number of features. The method additionally includes presenting a visualization of the low-dimensional characteristic space via a user interface.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 3b depicts a block diagram of a patent document, according to one or more embodiments illustrated and described herein;

FIG. 7 depicts a patent characteristic space, according to one or more embodiments illustrated and described herein;

FIGS. 10a, 10b, and 10c collectively depict a singular value decomposition of a patent characteristic space, according to one or more embodiments illustrated and described herein;

FIG. 11 depicts a flowchart of a method, according to one or more embodiments illustrated and described herein;

DETAILED DESCRIPTION

Systems, computing devices, and methods for presenting a visualization of a low-dimensional patent characteristic space that includes representations of one or more patents are disclosed herein. In some embodiments, a computing device generates a patent characteristic space including patent vectors having a first number of features. Each of the patent vectors represents a respective patent family of one or more respective patents, and each of the features represents a respective property of the respective patent families represented by the patent vectors. The computing device performs a linear dimensionality reduction on the patent characteristic space to obtain an intermediate characteristic space that includes the patent vectors having a number of features reduced to a second number of features selected based on the respective properties of the patent families. The computing device performs a non-linear dimensionality reduction on the intermediate characteristic space to obtain a reduced characteristic space that includes the patent vectors having a number of features reduced to a third number of features selected based on a visualization preference. The computing device presents a visualization of the reduced characteristic space via a user interface according to the visualization preference. By performing a linear reduction of the dimensions of the patent characteristic space to a given number selected based on the respective properties of the patent families, and then performing a non-linear reduction of the dimensions selected based on a visualization preference, a similarity (or dissimilarity) between patent families, as reflected by the distances between respective patent vectors representing the patent families, may be preserved even when transforming a high-dimensional patent characteristic space to a low-dimensional space for visualization. Various embodiments of systems, computing devices, and methods for presenting a visualization of a low-dimensional patent characteristic space that includes representations of one or more patents will now be described in detail with reference to the drawings.

Figure 1:
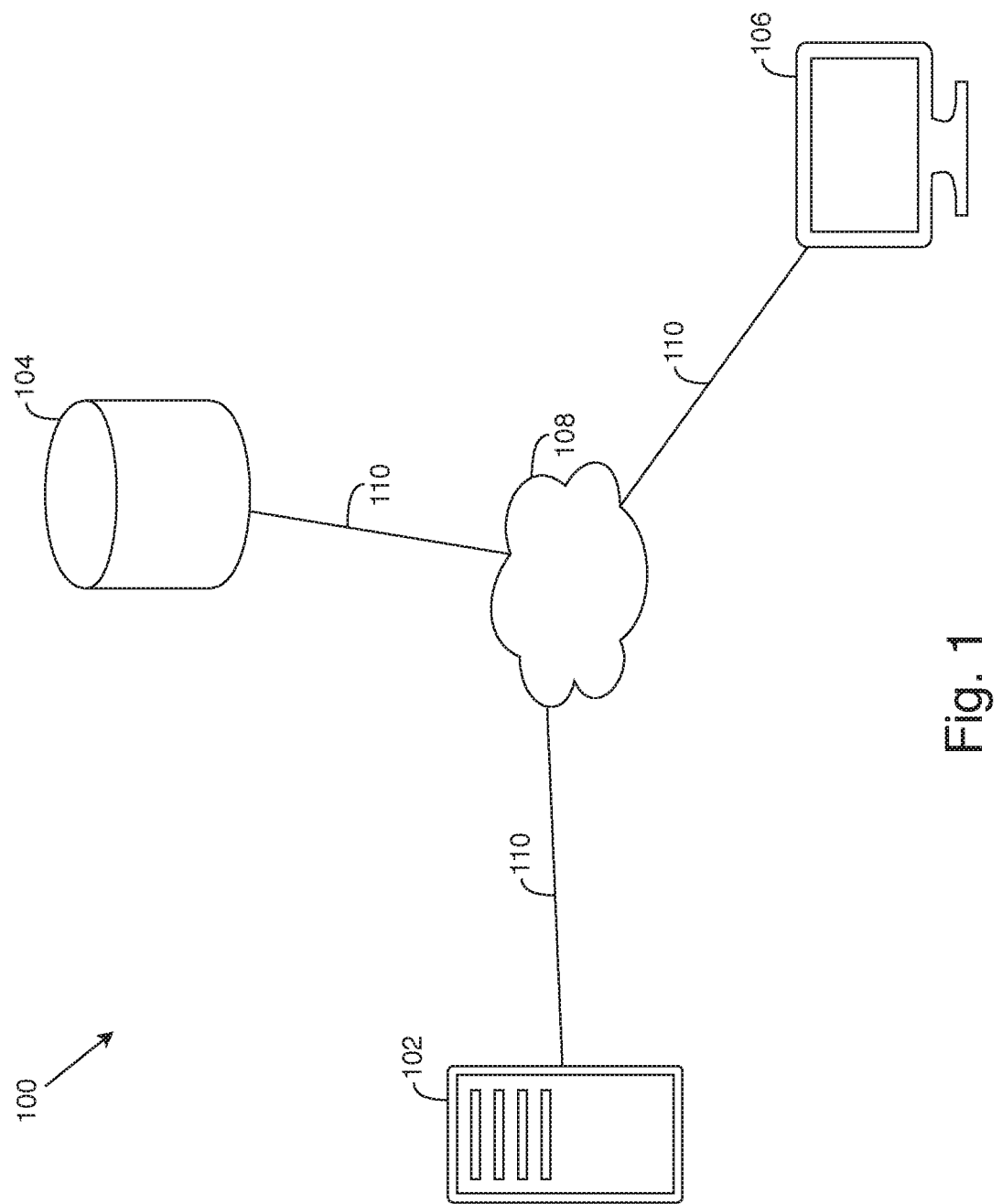
FIG. 1 depicts a block diagram of a system, according to one or more embodiments illustrated and described herein.

FIG. 1 depicts a block diagram of a system, according to one or more embodiments illustrated and described herein. As shown, a system 100 includes a computing device 102, a database 104, and a user terminal 106, each of which are communicatively connected via network 108 and respective communication links 110. It should be understood that, although the computing device, the database, and the user terminal are shown as separate entities, any one or more of these could be combined into a single entity or separated into additional entities. For example, computing device 102 could be combined with database 104, and both the computing device and the database could be combined with the user terminal, among other possibilities.

Computing device 102 could take the form of any device capable of carrying out the computing-device functions described herein. As such, the computing device could take the form of a personal computer, a workstation, a terminal, a server computer, a mainframe, a virtual machine, or any combination of these or other computing devices. The computing device may receive data representing one or more patent documents, characteristics of patent documents, vectors, models, or other data from database 104, and may send such data to the database, for example. The computing device may send, to a user interface of user terminal 106, data representing a model of a three-dimensional (or other low-dimensional) space for display by the user interface, and may receive data representing user input from the user interface, for instance. The computing device could take other forms as well.

Database 104 could take the form of a data storage, a computing device, a relational database management system (RDBMS), a table, a flat file, data in a file system of a data storage, a heap file, a B+ tree, a hash table, a hash bucket, or any combination of these, as examples, The database may be configured to store data representing patent documents, for example, and to send the data to one or more other entities such as computing device 102 and/or user terminal 106. Additionally, the database itself could take the form of a computing device. The database may also receive and store data from one or more other entities. Those of skill in the art will appreciate that the database may take other forms without departing from the scope of the disclosure.

User terminal 106 may be any component capable of carrying out the user-terminal functions described herein, and could take the form of (or include) a workstation, a terminal, a personal computer, a tablet device, a smartphone, or any combination of these, as just a few examples. The user terminal may include a user interface configured to receive input from a user, output information to the user, or both. User input might be achieved via a keyboard, a mouse, or another component communicatively linked to a general-purpose computer. As another possibility, input may be realized via a touchscreen display of a smart phone or tablet device. Output may be provided via a computer monitor or a loudspeaker (such as a computer speaker), again possibly communicatively linked to a general-purpose computer. Some components may provide for both input and output, such as the aforementioned touchscreen display. In an embodiment, the user terminal is configured to provide input, received via the user interface, to computing device 102 (e.g., using a communication interface), and to present output, received from the computing device, via the user interface. Those having skill in the art will understand that user terminal 106 may take numerous other forms as well.

Network 108 may include one or more computing systems and network infrastructure configured to facilitate communication between computing device 102, database 104, and user terminal 106. The network may take the form of (or include) one or more Wide-Area Networks (WANs), Local-Area Networks (LANs), the Internet, cellular networks, wired networks, wireless networks, or any combination of these or other networks. Network 108 operate according to one or more communication protocols such as Ethernet, WiFi, IP, TCP, or LTE, as examples. Though the network is shown as a single network, it should be understood that the network may include multiple, distinct networks that are communicatively linked. The network could take other forms as well.

Communication links 110 may communicatively link respective entities with network 108 to facilitate communication between entities communicatively connected to the network. Any of communication links 110 may be a combination of hardware and/or software, perhaps operating on one or more communication-link layers such as one or more physical, network, transport, and/or application layers. Additionally, the communication links may include one or more intermediate paths or systems, for example.

Figure 2:
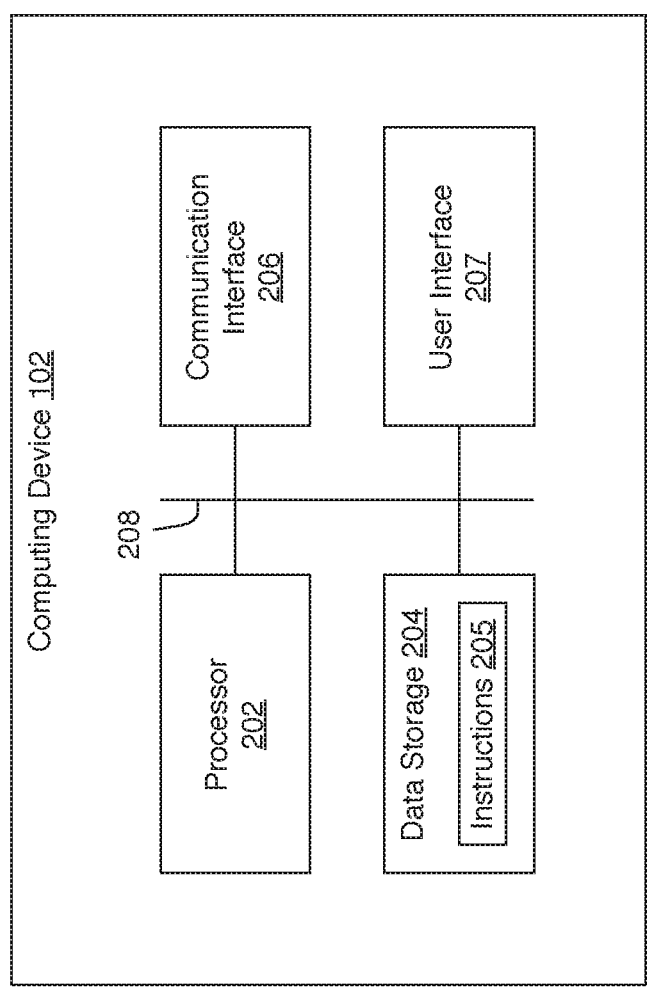
FIG. 2 depicts a block diagram of a computing device, according to one or more embodiments illustrated and described herein.

FIG. 2 depicts a block diagram of a computing device, according to one or more embodiments illustrated and described herein. As shown, computing device 102 includes a processor 202, a data storage 204, a communication interface 206, and a user interface 207, each of which are communicatively connected by a communication path 208. It should be understood that computing device 102 may include different and/or additional components, and some or all of the functions of a given component could instead be carried out by one or more different components.

Processor 202 may be any device capable of executing computer-readable instructions 205 stored in data storage 204. Processor 202 may take the form of a general purpose processor (e.g., a microprocessor), a special purpose processor (e.g., an application specific integrated circuit), an electronic controller, an integrated circuit, a microchip, a computer, or any combination of one or more of these, and may be integrated in whole or in part with data storage 204 or any other component of computing device 102, as examples.

Data storage 204 may take the form of a non-transitory computer-readable storage medium capable of storing instructions 205 such that the instructions can be accessed and executed by processor 202. As such, data storage 204 may take the form of RAM, ROM, a flash memory, a hard drive, or any combination of these, as examples. Instructions 205 may comprise logic or algorithm(s) written in any programming language of any generation (e.g., 1GL, 2GL, 3GL, 4GL, or 5GL) such as, for example, machine language that may be directly executed by the processor 202, or assembly language, object-oriented programming (OOP), scripting languages, microcode, etc., that may be compiled or assembled into machine readable instructions and stored in data storage 204. Alternatively, instructions 205 may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single data storage, other embodiments may include more than one data storage.

Communication interface 206 may be any component capable of performing the communication-interface functions described herein. As such, the communication interface could include or take the form of an Ethernet, Wi-Fi, Bluetooth, and/or universal serial bus (USB) interface, among many other possibilities.

User interface 207 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 102. User input might be achieved via a keyboard, a mouse, or other component communicatively linked to the driver-scoring device. As another possibility, input may be realized via a touchscreen display of the driver-scoring device in the form of a smartphone or tablet device. Some components may provide for both input and output, such as the aforementioned touchscreen display. Those having skill in the art will understand that user interface 207 may take numerous other forms as well.

Communication path 208 may be formed from any medium that is capable of transmitting a signal—for example, conductive wires, conductive traces, optical waveguides, or the like. Communication path 208 may also refer to the expanse in which electromagnetic radiation and their corresponding electromagnetic waves traverses. Moreover, communication path 208 may be formed from a combination of mediums capable of transmitting signals. In one embodiment, communication path 208 includes a combination of conductive traces, conductive wires, connectors, and buses that cooperate to permit the transmission of electrical data signals to and from the various components of computing device 102. Accordingly, communication path 208 may comprise a bus. Additionally, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

Communication path 208 may be formed from any medium that is capable of transmitting a signal—for example, conductive wires, conductive traces, optical waveguides, or the like. Communication path 208 may also refer to the expanse in which electromagnetic radiation and their corresponding electromagnetic waves traverses. Moreover, communication path 208 may be formed from a combination of mediums capable of transmitting signals. In one embodiment, communication path 208 includes a combination of conductive traces, conductive wires, connectors, and buses that cooperate to permit the transmission of electrical data signals to and from the various components of computing device 102. Accordingly, communication path 208 may comprise a bus. Additionally, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

Figure 3A:
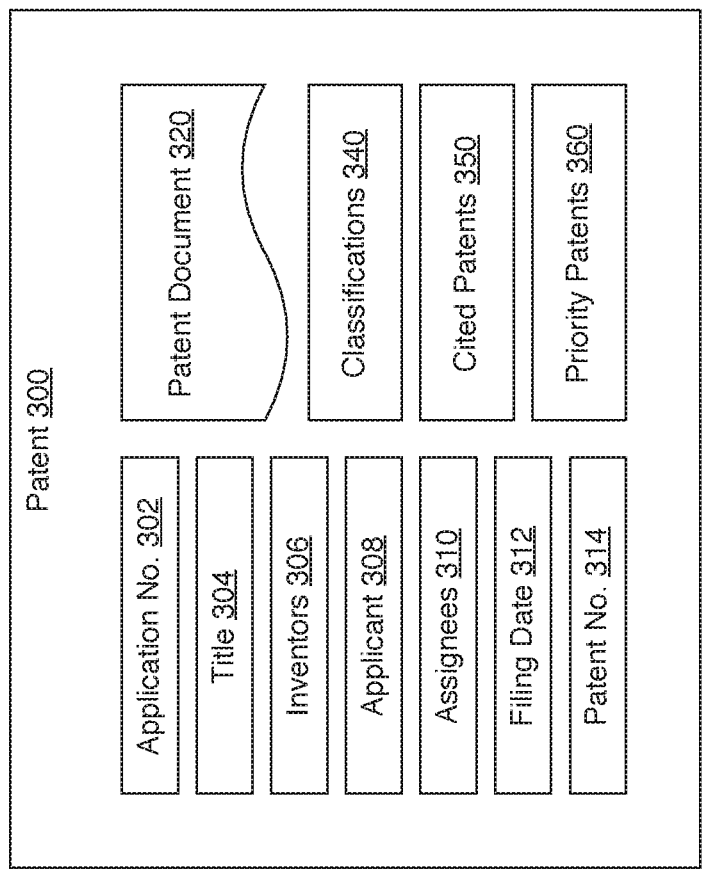
FIG. 3a depicts a block diagram of a patent, according to one or more embodiments illustrated and described herein.

FIG. 3a depicts a block diagram of a patent, according to one or more embodiments illustrated and described herein.

A patent may take the form of intellectual property that gives an owner of the patent—for a limited period of time—exclusive rights to the invention covered by the patent, in exchange for publishing a description of the invention that would allow person to make and use the invention (e.g., after the patent expires). A patent may take other forms as well, as should be understood by those of skill in the art.

As shown in FIG. 3a, a patent 300 has an application number 302, a title 304, one or more inventors 306, an applicant 308, one or more assignees 310, a filing date 312, and a patent number 314, and a corresponding patent document 320. Additionally, patent 300 may be assigned to one or patent classifications 340, and may include one or more cited patents, and/or one or more priority patents 360. Inventors 306 may be the one or more inventors of the invention of patent 300, and could include fewer, different, or additional inventors, among other possibilities. Additionally, filing date 312 may be, for instance, the date when the patent application for patent 300 was filed, and specifically the date when all the requirements for filing the patent application are completed (e.g., providing a description of the invention to the patent office and paying all fees required by the patent office).

Patent document 320 is a corresponding patent document of patent 300. The patent document may memorialize a patent application or an issued patent, or may take the form of any other patent document. As an example, the patent document may include the above-described description for allowing a person of skill in the relevant technology to make and use the invention. As another example, the patent document may include one or more patent claims that define the scope of protection sought by the patent application or granted by the issued.

FIG. 3b depicts a block diagram of a patent document, according to one or more embodiments illustrated and described herein. As shown, patent document 320 includes (e.g., memorializes) the above-described application number 302, title 304, inventors 306, applicant 308, assignees 310, filing date 312, patent number 314, classifications 340, cited patents 350, and priority patents 360. Further, patent document 320 includes (e.g., memorializes) a publication number 322, one or more claims 324, a detailed description 326, a background 328, an abstract 330, and a summary 332. Those of skill in the art will appreciate that patent document 320 may include different and/or additional parts.

Patent document 320 may take the form of a document published by a patent office or other organization. For instance, the Patent Cooperation Treaty (PCT) requires publication of all patent applications filed according to PCT procedure. Accordingly, the World Intellectual Property Organization (WIPO) publishes the patent application within (typically) eighteen months of filing a patent application according to PCT procedure. Similarly, patent applications filed at the patent office of a given country may be published by the respective patent office in a manner similar to that for publishing PCT applications. If the patent application is later issued as a patent, the patent office that issued the patent may publish the patent. Patent document 302 may the form of any one or more of these, among other possibilities.

Publication of patent document 320 can take the form of an electronic publication—for instance, by providing electronic access (e.g., via a website) to the filed patent application papers or to an electronic document describing the issued patent. As another possibility, publication could take the form of a printed publication (as was typical prior to widespread adoption of the World Wide Web), such as a published periodical or gazette that includes a description of the patents issued by the patent office (or the patent applications filed. Patent document 302 could take the form of an electronic publication, a printed publication, any other publication, or a combination of these, as examples.

Figure 4:
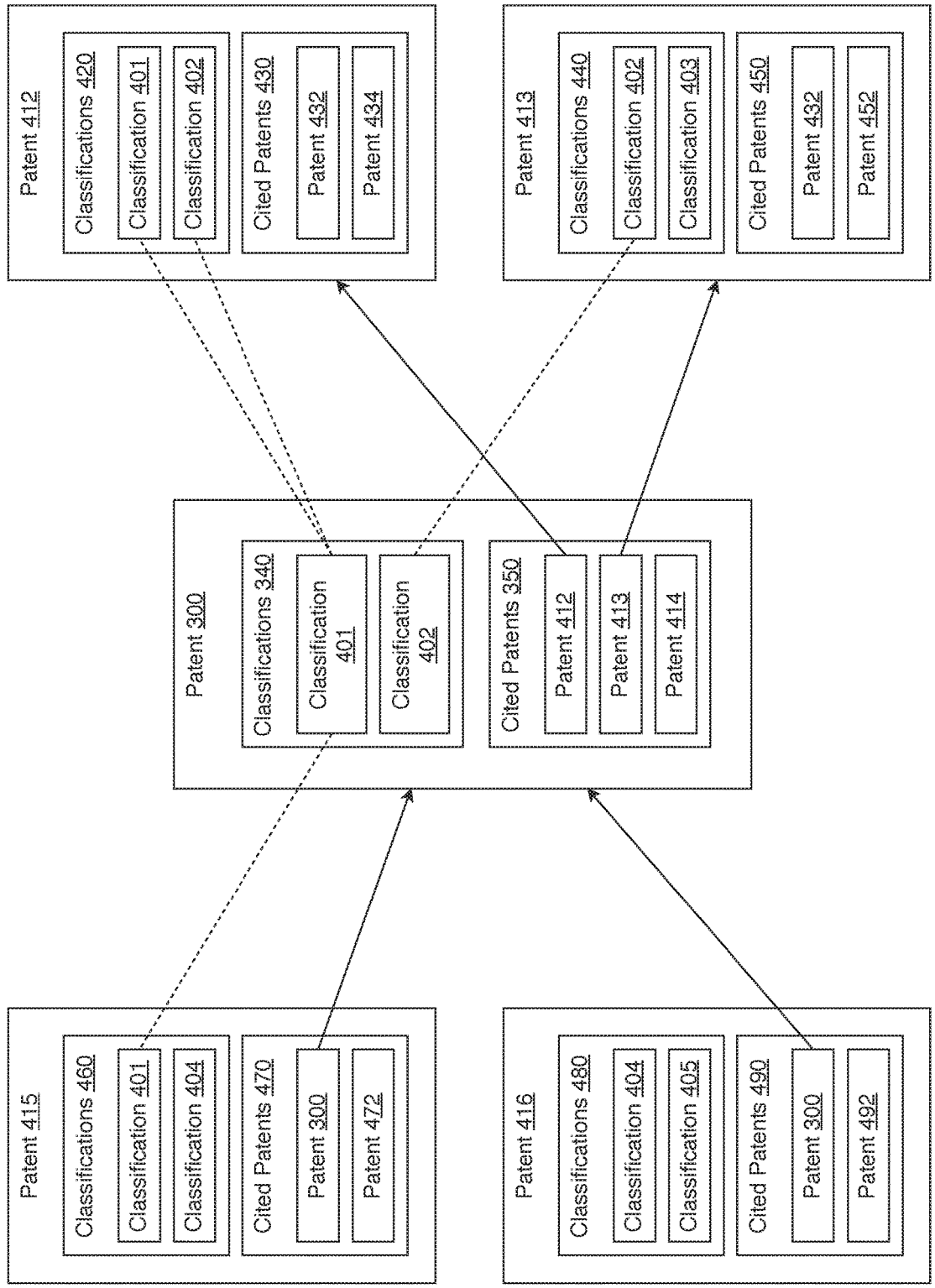
FIG. 4 depicts patent classifications and cited patents, according to one or more embodiments illustrated and described herein.

FIG. 4 depicts patent classifications 340 and cited patents 350 of patent 300, according to one or more embodiments illustrated and described herein. As shown, patent classifications 340 include a classification 401 and a classification 402, and cited patents 350 include a patent 412, a patent 413, and a patent 414.

Classification 401, classification 402, and/or any other classification among patent classifications 340 may be assigned by a patent office or other authority based on the subject matter of patent 300 (e.g., based on the description, claims, or both). In some instances, the patent classifications may be assigned when an application is filed. As an example, classification 401 could take the form of an International Patent Classification (IPC) class of B60T 8/176, which applies to patents directed to "brake regulation specially adapted to prevent excessive wheel slip during vehicle deceleration, e.g. ABS." Patent 300 could be assigned to classification 401 (i.e., IPC class B60T 8/176) based on the subject matter of the patent. Similarly, classification 402 could take the form of IPC class of B60T 8/171, which applies to patents directed to "detecting parameters used in the regulation of vehicle braking force" and to "measuring values used in the regulation," and patent 300 may be assigned to classification 402 (i.e., IPC class B60T 8/171) based on the subject matter of the patent. Any one or more of patent classifications 340 could take the form of a Cooperative Patent Classification (CPC), a United States Patent Classification (USPC), a German Patent Classification (DPK), the above-described International Patent Classification, or any combination of these, among other possibilities. It should be understood that patent classifications 340 could include fewer, different, or additional classifications, as examples. Alternatively, patent 300 may not be assigned to any patent classifications.

Patent 412, patent 413, patent 414, and any other patents among cited patents 350, each take the form of a respective patent cited by patent 300. During examination of a given patent application, a patent office may assert that one or more other patent applications, filed prior to the filing date of the patent application under examination, are directed to (or otherwise disclose) the same or similar subject matter of the given patent application, and the patent office may identify a corresponding publication of the previously-filed application as describing the same or similar subject matter. If the given patent application subsequently issues as a patent, then these previously filed applications (or their corresponding publications) are said to be "cited by" the issued patent, and may reflect that the given patent application was issued despite the same or similar subject matter of the previously-filed patent applications. If the application under examination is published by the patent office (e.g., in a gazette published periodically by the patent office), then the text of the application may identify these previously-filed applications, and these previously-filed applications are said to be "cited by" the application under examination. Conversely, the issued patent is said to "cite" to the previously-filed patent applications or corresponding publications.

Similar to patent 300, patent 412 may be assigned to one or more patent classifications 420, and patent 413 may be assigned to one or more patent classifications 440. In the illustrated embodiment, patent classications 420 (to which patent 412 is assigned) includes classification 401 and classification 402, and patent classifications 440 (to which patent 413 is assigned) includes classification 402 and classification 403. Therefore, like patent 300, patents 412 and 413 cited by patent 300 are assigned to classification 402. Additionally, like patent 300, patent 412 is assigned to classification 401, though patent 413 is not assigned to classification 401.

As further shown in FIG. 4, patent 300 may be cited by one or more other patents. In the illustrated embodiment, patent 415 includes (cites to) cited patents 470, and patent 416 includes (cites to) cited patents 490. Cited patents 470 (cited by patent 415) includes patent 300 and a patent 472, and cited patents 490 (cited by patent 416) includes patent 300 and patent 492. Accordingly, patent 415 and patent 416 both cite to patent 300, or stated another way, patent 300 is cited by both patent 415 and patent 416.

Similar to patents 300, 412, and 413, patent 415 may be assigned to one or more patent classifications 460, and patent 416 may be assigned to one or more patent classifications 480. In the illustrated embodiment, patent classifications 460 (to which patent 415 is assigned) includes classification 401 and classification 404, and patent classifications 480 (to which patent 416 is assigned) includes classification 404 and classification 405. Therefore, like patent 300, patent 415 (which cites to patent 300) is assigned to classification 401. However, patent classifications 480 (to which patent 416 is assigned) do not include a classification that is also among patent classifications 340 (to which patent 300 is assigned).

With reference again to FIG. 3a, priority patents 360 may include one or more claims for priority (by patent 300) to one or more previously filed patent applications. As an example, patent 300 may be part of a patent family of one or more other patents related to patent 300. For instance, the patent family could include one or more patents each disclosing the same or similar subject matter, sharing a common inventor, or including a priority claim to another patent in the patent family, as examples. In some instances, patent 300 may be the only patent in a patent family. As another example, a patent family may include a patent document filed in a given country in addition to one or more patent documents filed in different countries, each of which disclose the same subject matter and share a common inventor. As a further example, a patent family may include a patent document filed in a given county in addition to one or more patent document later filed in the same country, each of which disclose the same subject matter and share a common inventor. If a family includes more than one patent, then each patent in the patent family is related to all other patents in the patent family. Accordingly, priority patents 360 may include one or more claims for priority (by patent 300) to one or more previously-filed patent applications, and could take the form of multiple priority claims to respectively different patent applications.

Figure 5:
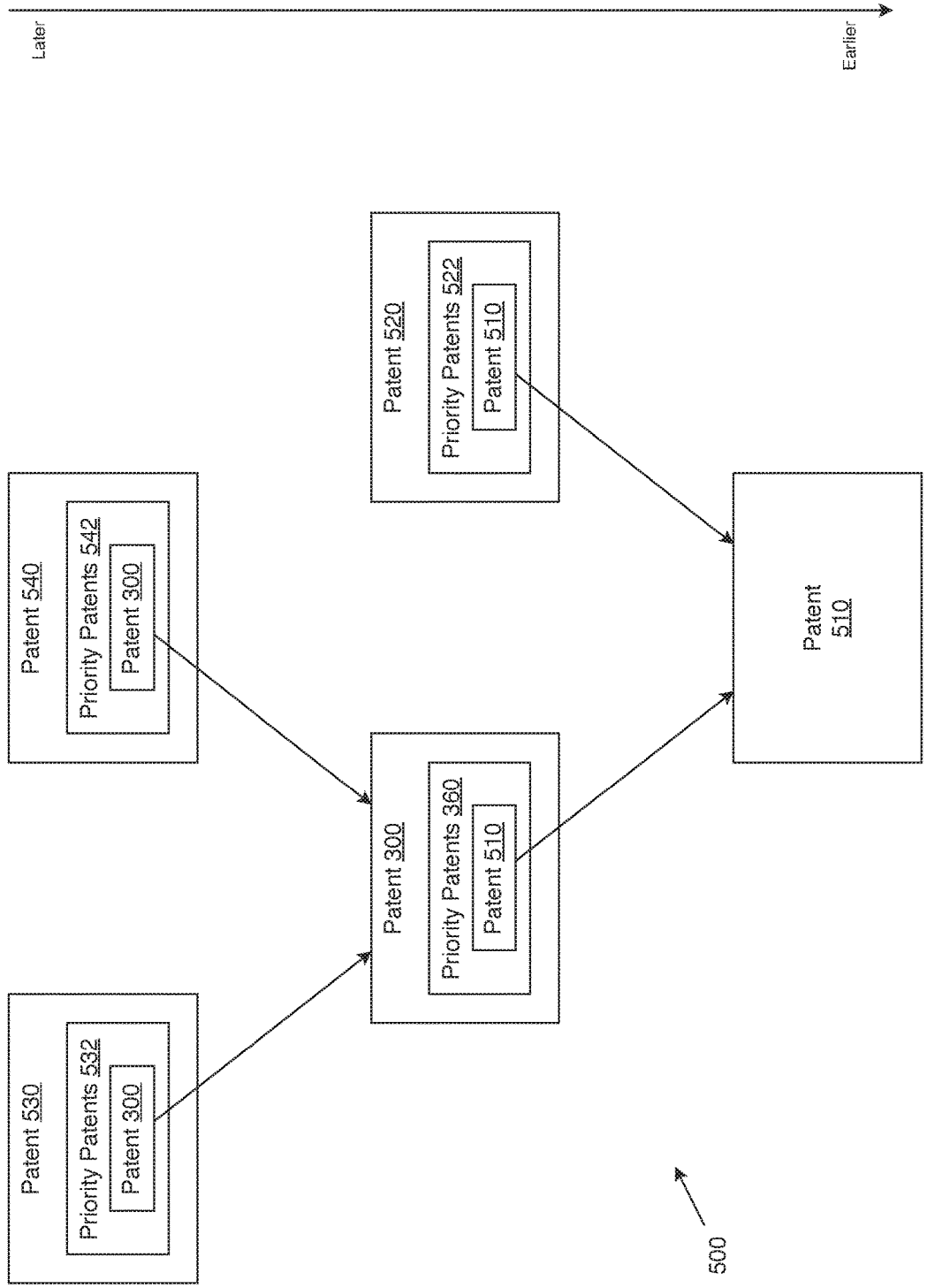
FIG. 5 depicts a patent family, according to one or more embodiments illustrated and described herein.

FIG. 5 depicts a patent family, according to one or more embodiments illustrated and described herein. As shown, a patent family 500 includes patent 300, as well as a patent 510, a patent 520, a patent 530, and a patent 540. Each of the patents in patent family 500 may have a respective priority date. For instance, in the embodiment of FIG. 5, the priority date of patent 510 is earlier than the respective priority dates of patent 300 and patent 520, which in turn are earlier than the respective priority dates of patent 530 and patent 540. As illustrated, priority patents 360 (to which patent 300 claims priority) includes patent 510, and priority patents 522 (to which patent 520 claims priority) also includes patent 510. Priority patents 532 (to which patent 530 claims priority) includes patent 300, and priority patents 542 (to which patent 540 claim priority) also includes patent 300. In the example shown in FIG. 5, patent 510 does not claim priority to any other patents, and no other patents claim priority to patents 300, 510, 520, 530, or 540. Additionally, in the illustrated embodiment, patents 300, 520, 530, and 540 do not claim priority to any other patents except for those shown in FIG. 5.

In the illustrated embodiment, all patents in patent family 500 claim priority, directly or indirectly, to patent 510 (except for patent 510 itself). Specifically, patent 510 takes the form of a "parent" patent with respect to both patents 300 and 520, and patents 300 and 520 both take the form of "child" patents with respect to patent 510, since priority patents 360 (to which patent 300 claims priority) and priority patents 522 (to which patent 520 claims priority) both include patent 510. Similarly, patent 300 takes the form of a "parent" patent with respect to both patents 530 and 540, and patents 530 and 540 both take the form of "child" patents with respect to patent 300, since priority patents 532 (to which patent 530 claims priority) and priority patents 542 (to which patent 540 claims priority) both include patent 300. Additionally, patent 510 takes the form of an "ancestor" patent with respect to patents 530 and 540, and patents 530 and 540 both take the form of "descendant" patents with respect to patent 510, since priority patents 532 and priority patents 542 both include patent 300, the priority patents 360 of which in turn include patent 510. Each of the arrows shown in FIG. 5 are directed from a given parent patent to a child patent that claims priority to the given parent patent.

In some embodiments, patent 300, patent 510, patent 520, patent 530, and patent 540 in patent family 500 are all directed to the same invention. Also, in some embodiments, the earliest priority patents—e.g., the patent or patents having the earliest respective filing dates 312 among priority patents 360—of the patents in patent family 500 are common to each of the patents in the patent family. It will be appreciated, however, that patent family 500 may include different and/or additional patents, and that in some instances, less than all patents in a given patent family (and the respective properties of those patents) will be represented by a given patent vector for that patent family in a patent characteristic space (as will be described in additional detail below).

It will be understood by those of skill in the art that this is only a brief and partial description of a patent and the patent application process, and that the form of the patent and the process for filing and obtaining a patent may depend on a number of factors, including the country or jurisdiction of the patent office examining the application for the patent.

Figure 6:
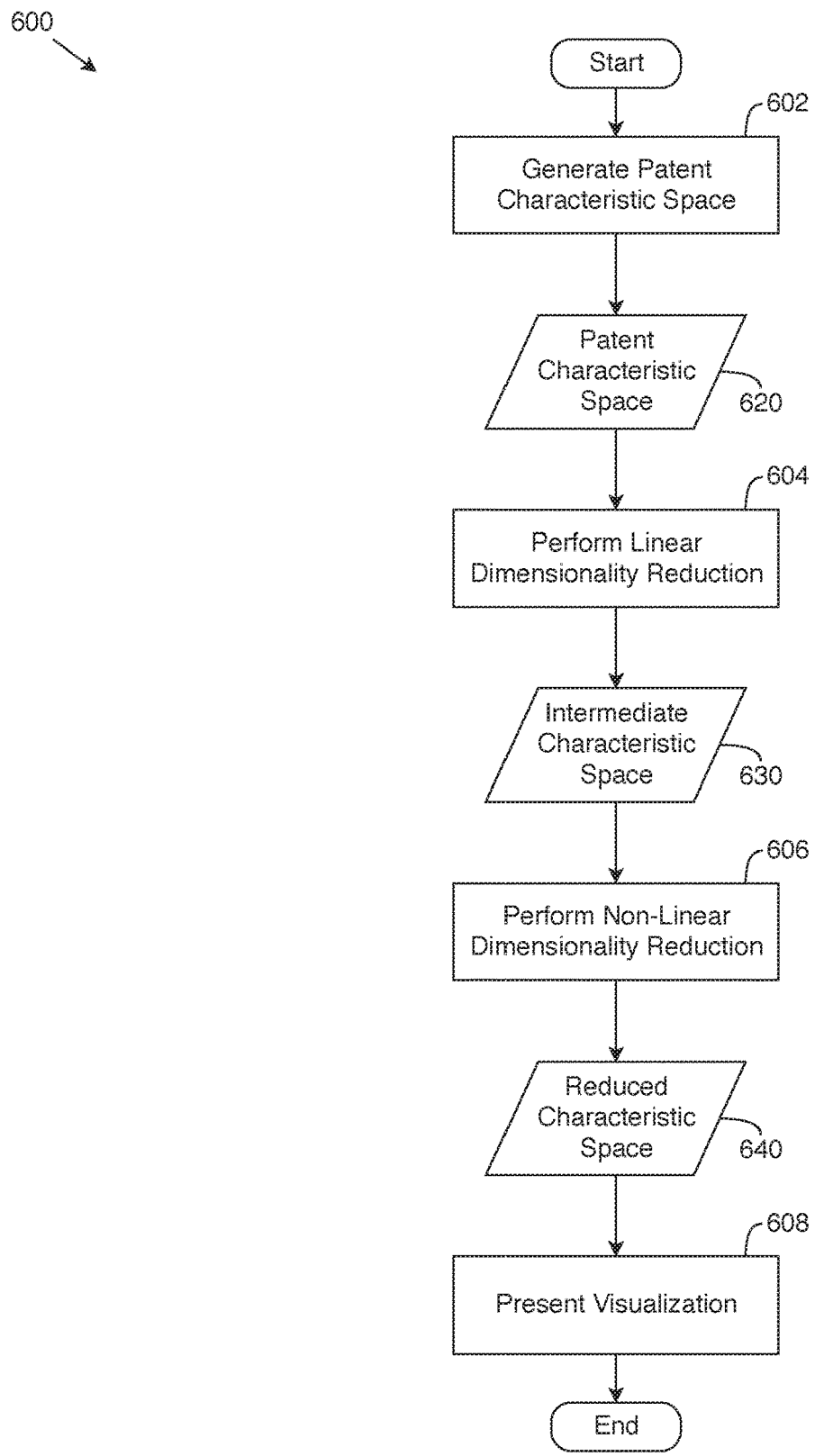
FIG. 6 depicts a flowchart of a method, according to one or more embodiments illustrated and described herein.

FIG. 6 depicts a flowchart of a method, according to one or more embodiments described and illustrated herein. Though the method is described as being carried out by the system 100, those of skill in the art will appreciate that the method may be carried out by any entity of the system, such as computing device 102, or by any combination of the entities, such as a combination of the computing device and database 104. Additionally, as discussed above, any one or more of the entities of the system may be combined into a single entity, and the method may be carried out by the combined entity.

As shown, a method 600 begins at step 602 with system 100 generating a patent characteristic space 620 of patent vectors. Each patent vector has a first number of features, and each patent vector represents a respective patent family of one or more patents. Each feature represents a respective property of the respective patent families represented by the patent vectors.

Figure 7:
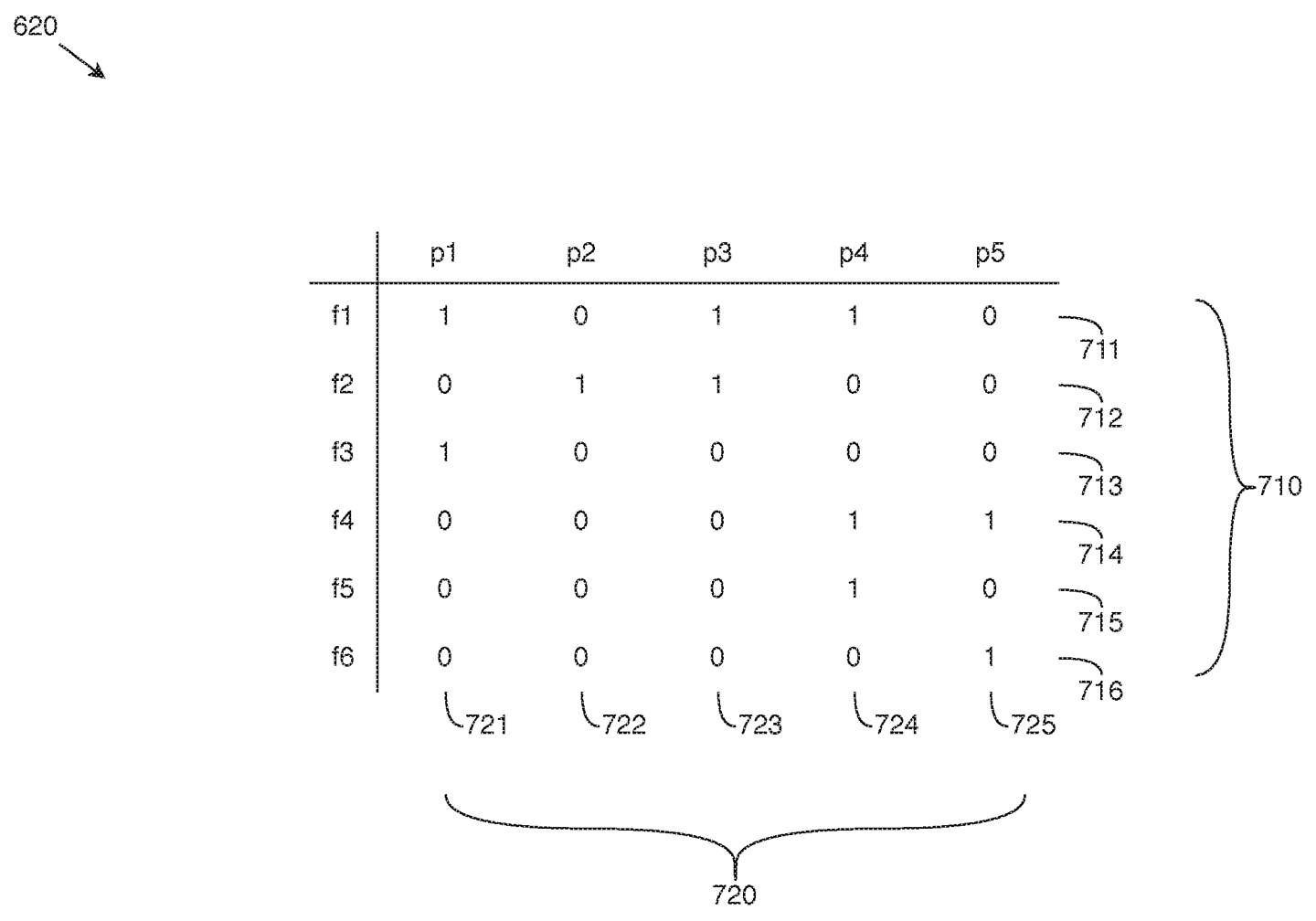

FIG. 7 depicts a patent characteristic space generated by system 100, according to one or more embodiments illustrated and described herein. As shown, patent characteristic space 620 includes patent vectors 710, and specifically, patent vectors 711, 712, 713, 714, 715, and 716 representing patent families f1, f2, f3, f4, f5, and f6 of one or more patents, respectively. Each of the patent vectors of patent characteristic space 620 has features 720, and specifically, features 721, 722, 723, 724, and 725 representing properties p1, p2, p3, p4, and p5 of patent families f1 to f6, respectively. In the example illustrated in FIG. 7, features 720 includes five features—in other words, each of the patent vectors of patent characteristic space 620 has five features. It should be understood that patent characteristic space 620 may include additional or fewer patent vectors (that is, the patent characteristic space may represent additional or fewer patent families), and that the patent vectors may have additional or fewer features (that is, additional or fewer properties of the patent families may be represented for each of the patent vectors).

In an embodiment, patent characteristic space 620 is represented by (e.g., takes the form of) a characteristic matrix including a plurality of rows and a plurality of columns. Each of the rows represents a respective patent family among patent families f1 to f6, and each of the columns represents a respective property among properties p1 to p5 of the patent families. However, it will be understood by those of skill in the art that patent characteristic space 620 may be represented in other forms as well.

Patent characteristic space 620 may be represented by (e.g., take the form of) a sparse matrix. For instance, the patent vectors of patent characteristic space 620 could include respective features indicating whether one hundred respectively different words are present in one or more patent documents of the patent families represented by the patent vectors. The respective values of a majority of features for a given patent vector could include a very low number of ones or other non-zero values (compared to the zero values of the features for the patent vector). However, patent characteristic space 620 need not take the form of a sparse matrix, and could instead be represented by (e.g., take the form of) a dense matrix, for example.

Table 1 lists example descriptions for properties p1, p2, p3, p4, and p5 of the respective patent families represented by patent vectors 610 in patent characteristic space 600. A given property of a patent family may be based on a respective property of one or more individual patents in the patent family, or a property of the patent family as a whole (or a combination of these). A given property could be represented as a binary number, an integer number, and/or a real number, among other possibilities that will be known to those of skill in the art.

TABLE 1

| Property | Description |
|---|---|
| p1 | Is any patent assigned to IPC class B60T 13/66? |
| p2 | Do cited patents include U.S. Pat. No. 5,281,006? |
| p3 | Are any cited patents assigned to IPC class B60T 13/70? |
| p4 | Ratio of patents that cite to patent assigned to IPC class B60T 13/70 |
| p5 | Does any patent cite a patent in IPC class B60T 13/66? |

In an embodiment, a given property represents whether any patent in a given patent family is assigned to a given patent classification. For example, as shown in Table 1, property p1 represents whether any patent in a patent family represented by a respective patent vector is assigned to IPC class B60T 13/66. As shown in FIG. 7, feature 721 of patent vectors 711 and 713 has a value of 1, indicating that patent family f1 and patent family f3 (represented by patent vectors 711 and 713, respectively) have property p1 (represented by feature 721) or that p1 is true, and specifically indicating that at least one patent in patent family f1 and patent family f3 is assigned to IPC class B60T 13/66 (which is the property represented by p1). Conversely, feature 721 of patent vectors 712, 714, 715, and 716 has a value of –, indicating that patent families f2, f4, f5, and f6 (represented by patent vectors 712, 714, 715, and 716, respectively) do not have property p1 (represented by feature 721) or that p1 is false, and specifically indicating that none of the patents in any of these families are assigned to IPC class B60T 13/68.

In another embodiment, a property of a patent family represents whether the cited patents (if any) of any patent in the patent family include a particular patent. A value of zero for a feature representing the property may indicate that, in the patent family represented by a given vector, none of the patents has cited patents (i.e., at least one cited patent) that include the particular patent. Similarly, a value of one for the feature may indicate that at least one of the patents has cited patents that include the particular patent. For instance, as shown in Table 1, property p2 indicates whether the cited patents of any patent in a given patent family include U.S. Pat. No. 5,281,006. In the example of FIG. 7, feature 722 represents property p2 of the patent family represented by a given patent vector. Feature 722 of patent vector 712 has a value of one, indicating that at least one of the patents in patent family f2 has cited patents that include U.S. Pat. No. 5,281,006. Feature 722 of patent vectors 711, 713, 714, 715, and 716 has a value of zero, indicating that none of the patents in patent family f2 has cited patents that include U.S. Pat. No. 5,281,006.

In a further embodiment, a property of a patent family represents whether the cited patents (if any) of any patent in the patent family include a patent having patent classifications that include a particular patent classification—that is, whether the patent classifications of the cited patents of any patent in the patent family include a given patent classification. A value of zero for a feature representing the property may indicate that, in the patent family represented by a given vector, none of the patents has cited patents that in turn have patent classifications that include the particular patent classification. Similarly, a value of one for the feature may indicate that at least one of the patents has cited patents having patent classifications that include the particular patent classification. For instance, as shown in Table 1, property p3 indicates whether the cited patents of any patent in a given patent family include a patent having patent classifications that include IPC class B60T 13/70. In the example of FIG. 7, feature 723 represents property p3 of the patent family represented by a given patent vector. Feature 723 of patent vectors 711 and 712 has a value of one, indicating that at least one of the patents in patent families f1 and f2 has cited patents having respective patent classifications that include IPC class B60T 13/70. Feature 723 of patent vectors 713, 714, 715, and 716 has a value of zero, including that none of the patents in patent family f3, f4, f5, and f6 has cited patents having respective patent classifications that include IPC class B60T 13/70.

In an additional embodiment, a property of a patent family represents a ratio of patents in the patent family that have cited patents having patent classifications that include a particular patent classification. A value for a feature representing the property may indicate the ratio of patents, in the patent family represented by a given vector, that have cited patents having patent classifications that include the particular patent classification. For instance, as shown in Table 1, property p4 represents the ratio of patents (in a given patent family) that have cited patents having patent classifications that include IPC class B60T 13/70. In the example of FIG. 7, feature 724 represents property p4 of the patent family represented by a given patent vector. Feature 724 of patent vectors 711, 714, and 715 has a value of one, indicating that all of the patents in patent families f1, f3, and f4 have cited patents having patent classifications that include IPC class B60T 13/70. Feature 724 of patent vectors 712, 713, and 716 has a value of zero, including that none of the patents in patent families f2, f3, and f6 has cited patents having respective patent classifications that include IPC class B60T 13/70. A value of 0.75 for feature 724 of a given patent vector may indicate that three quarters of the patents in the patent family represented by the patent vector have cited patent having patent classifications that include IPC class B60T 13/70.

In an embodiment, a property of a patent family represents whether the specifications (or other aspect) of the respective patent documents of the patents in the patent family include a particular word. A value for a feature representing the property may indicate whether the specifications, of the respective patent documents of the patents in the patent family represented by a given patent vector, includes the particular word. For instance, a value of zero for the feature may indicate that the specifications do not include the particular word, while a value of one could indicate that the specifications do include the particular word. As an example, the feature could indicate whether the specifications include the word "accelerate": a value of one could indicate that the specifications include the word "accelerate," while a value of zero could indicate that the specifications do not include the word "accelerate." In an embodiment, a property of a patent family represents the number of instances of a particular word in the specifications (i.e., the number of times the particular word appears in the specifications) or other aspect of the respective patent documents of the patents in the patent family. A value for a feature representing the property may indicate the number of instances of the particular word in the specifications of the respective patent documents of the patents in the patent family represented by a given patent vector. As an example, the feature could indicate the number of instances of the word "accelerate" in the specifications. A value of nine could indicate that the specifications include nine instances of the word accelerate.

In an embodiment, a property of a patent family represents a weighted classification value for a given patent classification, where the weighted classification value comprises a sum of a first term and a second term. The first term is one if at least one of the patents in the patent family is assigned to the given patent classification, or zero if none of the patents in the patent family are assigned to the given patent classification. The second term is a ratio of (i) a number of patents in the patent family that cite to a patent in another patent family having at least one patent assigned to the given patent classification, to (ii) a number of all patent families (i.e., the respective patent families of all the patent vectors in patent characteristic space 620), other than the respective patent family, having a patent cited by at least one of the patents in the patent family.

Figure 8:
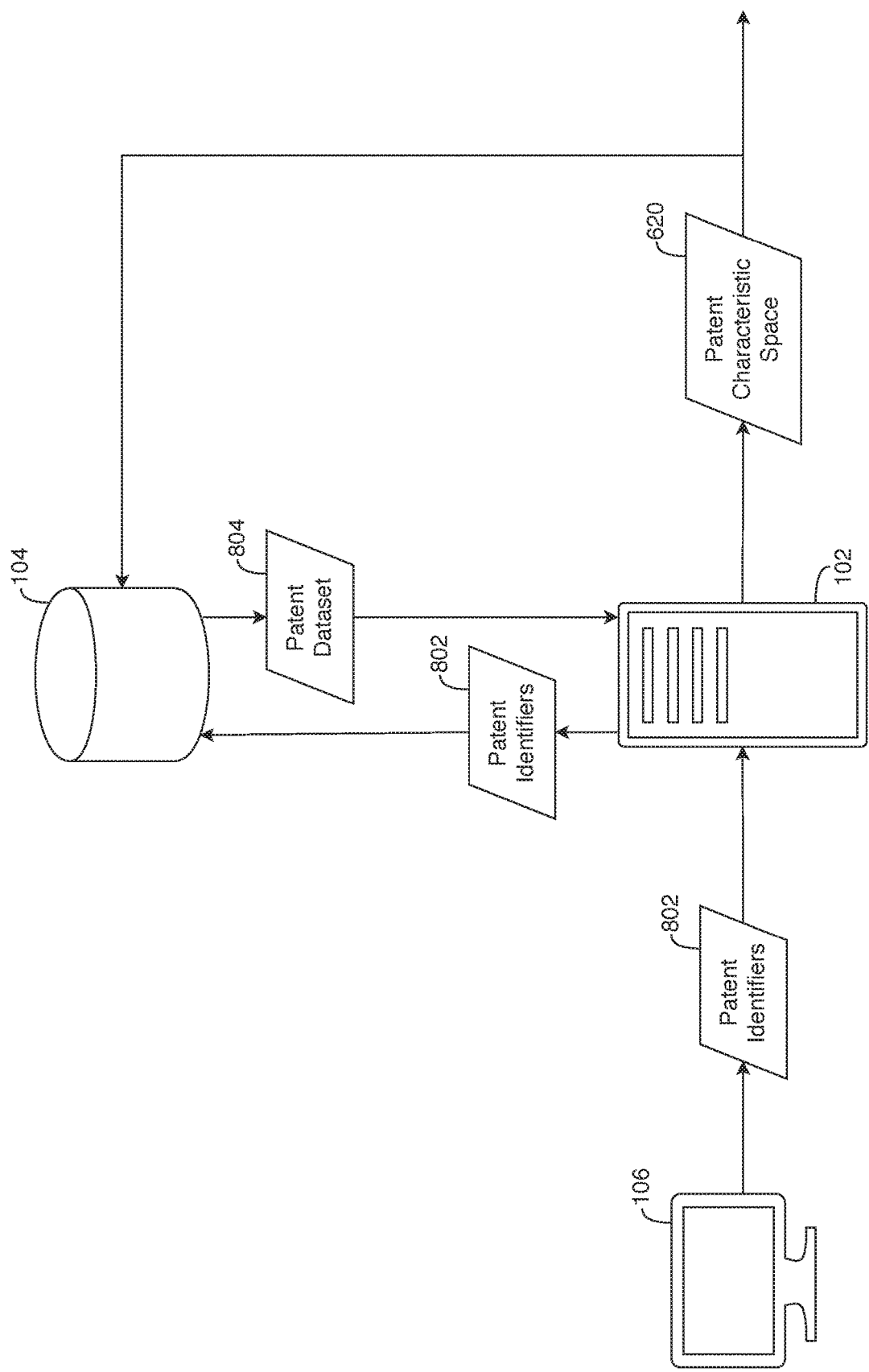
FIG. 8 depicts a data flow for generating a patent characteristic space, according to one or more embodiments illustrated and described herein.

FIG. 8 depicts a data flow for generating a patent characteristic space, according to one or more embodiments illustrated and described herein. As shown, computing device 102 receives one or more patents identifiers 802 from user terminal 106. For instance, computing device 102 may receive a message from user terminal 106 that includes an indication of patent identifiers 802. Messages—such as messages that include an indication of patent identifiers, or any other messages—may be sent and/or received via network 108 over communications link 110, and could take the form of one or more packets, datagrams, data structures, other data, or any combination of these or other messages. Patent identifiers 802 could take the form of (or include) one or more patent numbers that uniquely identify respective patents. Additionally or alternatively, patent identifiers 802 could take the form of (or include) one or more patent classifications, assignees, filing dates, or other properties that could be used to identify one or more patents. Those of skill in the art will appreciate that numerous other examples are possible as well.

Computing device 102 provides received patent identifiers 802 to database 104, and receives patent dataset 804 provided to the computing device by the database based on the patent identifiers. Patent dataset 804 could take the form of a table that indicates respective properties of one or more patents selected by database 104 based on patent identifiers 802 provided to the database. As another possibility, patent dataset 804 could take the form of a patent characteristic space (e.g., data representing the patent characteristic space) previously generated by computing device 102, database 104, or another entity. For instance, database 104 could store one or more patent characteristic spaces (e.g., for respectively different or overlapping sets of patent families), and patent dataset 804 could take the form of a patent characteristic space stored by database 104 and selected by the database based on patent identifiers 802 provided to the database. Patent dataset 804 could include only the patents identified by patent identifiers 802, or could include additional patents such as patents in the same patent family as the identified patents or patents that are similar or relevant to the identified patents (even if not explicitly identified by patent identifiers 802), among numerous other possibilities. Patent dataset 804 could be received over network 108 via one or more messages from database 104, for example.

Computing device 102 may generate patent characteristic space 620 based on patent dataset 804 received from database 104. If patent dataset 804 is not a patent characteristic space but includes data based upon which a patent characteristic space may be generated (such as data that indicates respective properties of one or more patents), then computing device 102 may generate patent characteristic space 620 based on the data. Additionally, computing device 102 may provide the generated patent characteristic space to database 104 for storage by the database (e.g., by sending one or more messages over network 108 that include data representing that patent characteristic space). In response to subsequent requests for a patent dataset based on similar or identical patent identifiers received from computing device 102, database 104 could provide the previously-generated patent characteristic space to the computing device.

It should be understood that the embodiment of FIG. 8 is just one example of a data flow for generating a patent characteristic space, and that numerous other variations are possible with departing from the scope of the present disclosure.

With reference again to FIG. 6, at step 604, system 100 performs a linear dimensionality reduction on patent characteristic space 620 to obtain an intermediate characteristic space 630.

Figure 9:
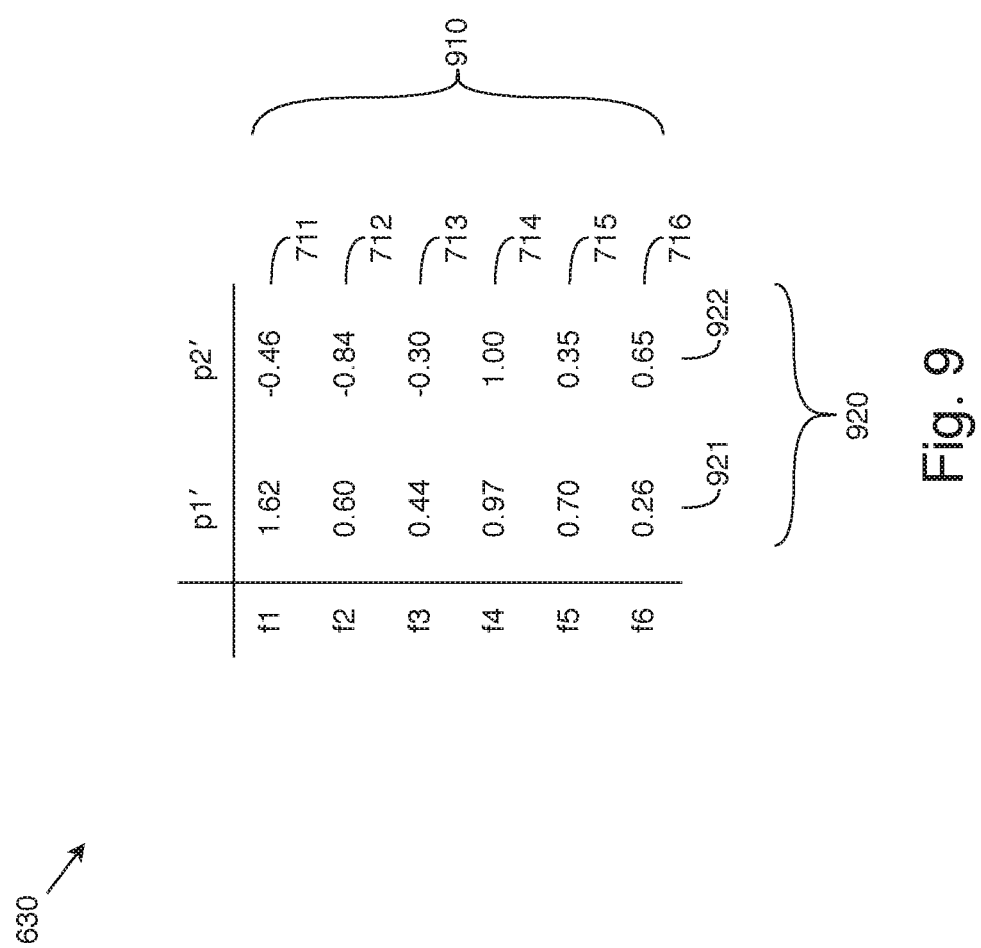
FIG. 9 depicts an intermediate characteristic space, according to one or more embodiments illustrated and described herein.

FIG. 9 depicts intermediate characteristic space 630, according to one or more embodiments illustrated and described herein. As shown, intermediate characteristic space 630 includes patent vectors 910, which are patent vectors 711 to 716 having a number of features reduced to a second number of features 920, which are features 921 and 922. In the embodiment of FIG. 9, the second number is two such that patent vectors 910 have two features—namely, features 921 and 922—but it should be understood that the second number could be a different number.

Features 921 and 922 may represent respective transformed properties p1' and p2' of the patent families. A given transformed property may represent one or more of properties p1 through p5 (described previously with reference to FIG. 7) that have been folded in to the transformed property such that the value of the given transformed property is based on any one or more of properties p1 through p5. A given property p1 through p5 may be folded into one or more (or none) of the transformed properties.

In an embodiment, the linear dimensionality reduction comprises a singular value decomposition (SVD) reduction, and system 100 may generate intermediate characteristic space 630 based on the SVD of patent characteristic space 620. As an example, an SVD of patent characteristic space 620 could take the form of $M = U\Sigma V^T$, where M represents patent characteristic space 620, U represents the left-singular vectors of the patent characteristic space, $V^T$ represents the conjugate transpose of the right-singular vectors of the patent characteristic space, and $\Sigma$ represents the singular values of the patent characteristic space.

FIGS. 10a, 10b, and 10c depict respective components of an SVD of patent characteristic space 620, according to one or more embodiments described and illustrated herein. As shown in FIG. 10a, a matrix 1002 represents the left-singular vectors U of patent characteristic space 620, a matrix 1004 represents the singular values $\Sigma$ of the patent characteristic space, and a matrix 1006 represents the conjugate transpose $V^T$ of the right-singular vectors of the patent characteristic space.

In an embodiment, system 100 obtains an SVD of patent characteristic space 620, which includes the left-singular vectors U of patent characteristic space 620 (represented by matrix 1002) and the singular values $\Sigma$ of the patent characteristic space (represented by matrix 1004). Next, the system obtains a matrix $\Sigma'$ that includes a number of the left-most columns of matrix 1002 equal to the above-described second number. In this embodiment, the second number number (of columns of matrix $\Sigma'$) is fewer than the number of columns of $\Sigma$ represented by matrix 1004. For instance, the matrix $\Sigma'$ could include only the two left-most columns of matrix 1004. System 100 then obtains, as intermediate characteristic space 630, a reduced-dimensionality matrix M' equal to a dot product U·$\Sigma'$ of U and $\Sigma'$. In the embodiment illustrated in FIG. 9, intermediate characteristic space 630 takes the form of the reduced-dimensionality matrix M'.

It will be appreciated by those of skill in the art that the linear dimensionality reduction performed at step 602 could take other forms as well. For instance, the linear dimensionality reduction could take the form of (or include) a principal component analysis (PCA) reduction, the above-described SVD reduction, another linear dimensionality reduction, or a combination of these, as examples.

In some embodiments, intermediate characteristic space 630 is stored in a memory of computing device 102, but consumes less memory than if the patent characteristic space 620 itself were to be stored in a memory of the computing device. Because of the lower memory footprint of intermediate characteristic space 630, and because any additional processing of intermediate characteristic space 630 may involve consideration of a fewer number of features (than would additional processing of patent characteristic space 620 as a whole), system 100 may be able to perform more complex transformations on the intermediate characteristic space 630 than would be possible on patent characteristic space 620. As one possibility, intermediate characteristic space 630 may be completely stored in a memory. As another possibility, part or all intermediate characteristic space 630 may be stored in data storage 204, and part of intermediate characteristic space 630 may be stored in memory such that additional parts of the intermediate characteristic space may later be obtained from the data storage and stored in the memory. Part or all of intermediate characteristic space 630 could be stored in database 104. Other examples are possible as well.

In one or more embodiments, the second number of features (to which the patent vectors 711-716 of patent characteristic space 620 are reduced to obtain intermediate characteristic space 630) is less than the number of features of the patent vectors in the patent characteristic space (prior to performing the linear dimensionality reduction). The second number of features could be, for example, between five and one hundred twenty (inclusive), between ten and one hundred twenty (inclusive), or less than or between other numbers of features, among other examples.

As one possibility, the second number of features could selected be based on input received via user terminal 106. For instance, a user could indicate, via the user interface, that the second number of features should be equal to two. According to an embodiment in which the linear dimensionality reduction comprises a singular value decomposition (SVD) reduction as described above, system 100 may obtain a matrix $\Sigma'$ that includes the two left-most columns of matrix 1004, and may obtain intermediate characteristic space 630 as a dot product of matrix 1004 and matrix $\Sigma'$ such that the patent vectors of the intermediate characteristic space have two features, based on the input received via the user interface specifying that the second number of features should be equal to two. As another possibility, the second number of features is selected based on the respective properties of the patent families, as described in additional detail below.

FIG. 11 depicts a flowchart of a method of selecting the second number of features. As shown, a method 1100 begins at step 1102 with system 100 generating a frequency list of patent classifications.

Table 2 is an example of frequency list generated by system 100 at step 1102. In the embodiment of Table 2, the frequency list is generated according to respective frequencies of the patent classifications. The respective frequency of each of the patent classifications in the list comprises a number of the patent families having at least one patent assigned to the patent classification. The list of patent classifications may include at least one of an International Patent Classification (IPC), a Cooperative Patent Classification (CPC), a United States Patent Classification (USPC), and a German Patent Classification (DPK), among other possibilities. In the embodiment of Table 2, the patent classification is an IPC class.

TABLE 2

| IPC Class | Number of Families |
| --- | --- |
| A61F2/30 | 394 |
| A61F13/20 | 282 |
| A61N1/18 | 190 |
| A61B17/58 | 148 |
| A61B18/04 | 160 |
| A61B18/14 | 164 |
| A61B17/86 | 83 |
| A61B17/17 | 67 |
| A61F2/28 | 69 |
| A61M35/00 | 59 |
| A61B17/70 | 55 |
| A61B17/80 | 45 |
| A61F2/44 | 38 |
| A61B17/72 | 25 |
| A61B17/60 | 5 |
| A61F13/22 | 4 |

Referring again to FIG. 11, at step 1104, system 100 obtains a count of patent classifications in the frequency list (generated at step 1102) having respective frequencies that are no less than a threshold percent of the respective frequency of a patent classification having the highest respective frequency among the patent classifications in the frequency list.

In Table 2, the patent classification having the highest respective frequency among the patent classifications in the frequency list is IPC Class A61F2/30 having a frequency of 394, reflecting that 394 patent families have at least one patent assigned to IPC Class A61F2/30. In an embodiment, the threshold percent is fifteen percent, in which case the system 100 would obtain a count of patent classifications in the list having respective frequencies that are no less than fifteen percent of three hundred ninety four, which is a frequency of approximately fifty nine. In this example, the obtained count would be ten, since ten patent classifications in the frequency list have respective frequencies that are no less than fifty nine.

At step 1106, system 100 selects the second number of features based on the count obtained at step 1104. In an embodiment, selecting the second number of features based on the obtained count of patent classifications comprises selecting, as the second number of features, one more than the obtained count of patent classifications. In such an embodiment, with respect to the example of Table 2, eleven would be selected as the second number, since eleven is one more than the obtained count of patent classifications.

In some embodiments, selecting the second number of features based on the obtained count of patent classifications comprises selecting, as the second number of features, a number of features between ten and one hundred twenty, inclusive, based on the obtained count of patent classifications. For example, if an obtained count (described above) were seven, then ten may be selected as the second number, rather than eight (which is one more than the obtained count), so that the second number is at least ten. As another example, if an obtained count were four hundred thirty, then one hundred twenty may be selected as the second number, rather than four hundred thirty one (which is one more than the obtained count), so that the second number is no more than one hundred twenty. Those of skill in the art will appreciate that other numbers (besides ten and one hundred twenty) could be used as well.

In an embodiment, the linear dimensionality reduction is performed such that the intermediate characteristic space is obtained as a normalized space such that the length of each patent vector is a length of one. For instance, the intermediate characteristic space may be obtained as a normalized space by dividing each patent vector in the intermediate characteristic space by its respective Euclidian length. In some embodiments, system 100 generates a similarity matrix that includes a plurality of similarity vectors. Each similarity vector may represent a similarity between pairs of patent vectors of intermediate characteristic space 630.

Figure 12:
FIG. 12 depicts a similarity matrix, according to one or more embodiments illustrated and described herein.

FIG. 12 depicts a similarity matrix, according to one or more embodiments described and illustrated herein. As shown, a similarity matrix 1200 includes pairwise distances between pairs of patent vectors of intermediate characteristic space 630. The rows represent respective patent vectors of the intermediate characteristic space, and the columns likewise represent patent vectors of the intermediate characteristic space. A given value $V_{i,j}$ of the matrix represents the distance between a patent vector represented by row i and another patent vector represented by column j. Accordingly, a value $V_{1,1}$ represents the distance between the first patent vector of the intermediate characteristic space and the same first patent vector of the intermediate characteristic space, which as shown by similarity matrix 1200, has a value of zero since the patent vectors are the same patent vector. A value $V_{1,3}$ represents the distance between the first patent vector and the third patent vector, which is 1.19 in this example. A given value could indicate a Euclidean distance between the patent vectors, though other examples are possible as well.

It should be understood that similarity matrix 1200 need not include pairwise distances between all pairs of patent vectors of intermediate characteristic space 630. Moreover, even though pairwise distances may be represented as a matrix (as in similarity matrix 1200), pairwise distances or similarities could be represented in other forms as well. For instance, the pairwise distances could represented using data points of a KD-Tree or Ball-Tree, and computing device 102 could query and store a given number of nearest neighbors of the data points in the tree.

At step 606, system 100 performs a non-linear dimensionality reduction on intermediate characteristic space 630 to obtain a reduced characteristic space 640 that includes patent vectors 711-716 having a number of features reduced to a third number of features selected based on a visualization preference. For instance, reduced characteristic space 640 may take the form of a low-dimensional space that includes patent vectors 711-716 (having a number of features reduced to a third number of features) positioned in the low-dimensional space. The low-dimensional space could be a three-dimensional space, a two-dimensional space, or a one-dimensional space, as examples. For instance, the low-dimensional space could take the form of a space suitable for visualization via a user interface.

The non-linear dimensionality reduction could take the form of (or include) a Uniform Manifold Approximation and Projection (UMAP) reduction. In an example, computing device 102 generates a first topological representation of intermediate characteristic space 630 based on local manifold approximations and respective local fuzzy-simplicial-set representations. Additionally, computing device 102 generates a second, low-dimensional topological representation of intermediate characteristic space 630—e.g., by randomly or arbitrarily positioning, within the second topological representation, vectors representing respective patent vectors 910 of intermediate characteristic space 630. Computing device 102 generates reduced characteristic space 640 by optimizing the second, low-dimensional topological representation via minimization of the crossentropy between the first and second topological representations. This process may represented as:

```
function UMAP(X, n, d, min-dist, n-epochs)
    for all x ∈ X do
        fs-set[x] ← LocalFuzzySimplicialSet(X, x, n)         (1)
    top-rep ← U_{x∈X} fs-set[x]
    Y ← SpectralEmbedding(top-rep, d)
    Y ← OptimizeEmbedding(top-rep, Y, min-dist, n-epochs)
    return Y
``` where $X=\{x_1, \ldots, x_n\}$ are intermediate characteristic space 630 and patent vectors 910 of the intermediate characteristic space, respectively, n is the number of neighbors to consider when approximating the local metric, d is the target dimension, min-dist is the desired separation between close points in the embedding space, and n-epochs is the number of training epochs to use when optimizing the low dimensional representation, and Y returned from the UMAP function is reduced characteristic space 640. Additionally, LocalFuzzySimplicialSet(X, x, n) generates local fuzzy simplicial sets, SpectralEmbedding(top-rep, d) performs spectral embedding, and OptimizeEmbedding(top-rep, Y, min-dist, n-epochs) is the optimization of the embedding through minimization of the fuzzy set cross entropy. In some such embodiments the number of neighbors n is twenty, and in some embodiments, the desired separation min-dist is one half.

In some embodiments, computing device 102 generates a low-dimensional space S that includes patent vectors positioned randomly or arbitrarily in the low-dimensional space. The low-dimensional space could be a three-dimensional space, a two-dimensional space, or a one-dimensional space, as examples. For instance, the low-dimensional space could take the form of a space suitable for visualization via a user interface. The patent vectors represent respective patent families (e.g., represented by respective patent vectors of patent characteristic space 620 or respective patent vectors of intermediate characteristic space 630).

In one such embodiment, computing device 102 generates a distance matrix that includes distance vectors representing distances between respective pairs of patent vectors positioned in the low-dimensional space S. Generating the distance matrix could take a form similar to that for generating similarity matrix 1200. For instance, the rows of the distance matrix may represent respective patent vectors positioned in the low-dimensional space S, and the columns may likewise represent respective patent vectors positioned in the low-dimensional space. A given value $V_{i,j}$ of the distance matrix may therefore represent the distance between a patent vector represented by row i and another patent vector represented by column j.

In such an embodiment, computing device 102 may reposition one or more of the patent vectors in the low-dimensional space S, and may update the distance matrix based on the repositioning of the patent vectors. Computing device 102 may perform one or more iterations of repositioning one or more of the patent vectors in the low-dimensional space S and updating the distance matrix based on the repositioning of the patent vectors. Also, computing device 102 may perform the iterations such that a similarity between the similarity matrix and the distance matrix increases over the plurality of iterations. In some embodiments, the similarity between the similarity matrix and the distance matrix does not increase after performing a respective iteration, but increases after performing multiple iterations—e.g., by converging to an increased similarity after performing the multiple iterations. In other embodiments, the similarity increases after performing each respective iteration. The similarity between the similarity matrix and the distance matrix may be based on, for example, a Kullback-Leibler (KL) distance between the similarity matrix and the distance matrix, though other examples are possible as well.

In the above embodiment, reduced characteristic space 640 (obtained by performing the non-linear dimensionality reduction on intermediate characteristic space 630) may take the form of low-dimensional space S after computing device 102 has performed one or more iterations of repositioning the patent vectors and updating the distance matrix.

As mentioned above, the similarity matrix need not take the form of a matrix per se. Rather, the similarity matrix, as well as the distance matrix, could be represented using data points of a KD-Tree, a Ball-Tree, or another representation, as examples. Computing device 102 could query and store a given number of nearest neighbors of the data points in the tree, such as the number of considered neighbors discussed above, among numerous other possibilities.

The non-linear dimensionality reduction could take other forms as well, such as a t-distributed stochastic neighbor embedding (t-SNE) reduction, which may model each of the patent vectors 910 in intermediate space 630 by a two- or three-dimensional point (or other low-dimensional space) such that that similar patent vectors are modeled by nearby points and dissimilar patent vectors are modeled by distant points. For instance, performing a t-SNE reduction may include computing device 102 generating a probability distribution over pairs of patent vectors 910 in intermediate space 630 such that similar patent vectors have a high probability of selection while dissimilar patent vectors have a low probability of selection. Computing device 102 may generate another probability distribution over points in the low-dimensional space, and may minimizes the KL divergence between the two distributions with respect to the locations of the points in the low-dimensional space. Additionally or alternatively, the non-linear dimensionality reduction could take the form of a multidimensional scaling (MDS) reduction, another non-linear dimensionality reduction, or a combination of these (perhaps in addition to the UMAP reduction or t-SNE reduction described above). Other examples are possible as well without departing from the scope of the disclosure.

Figure 13:
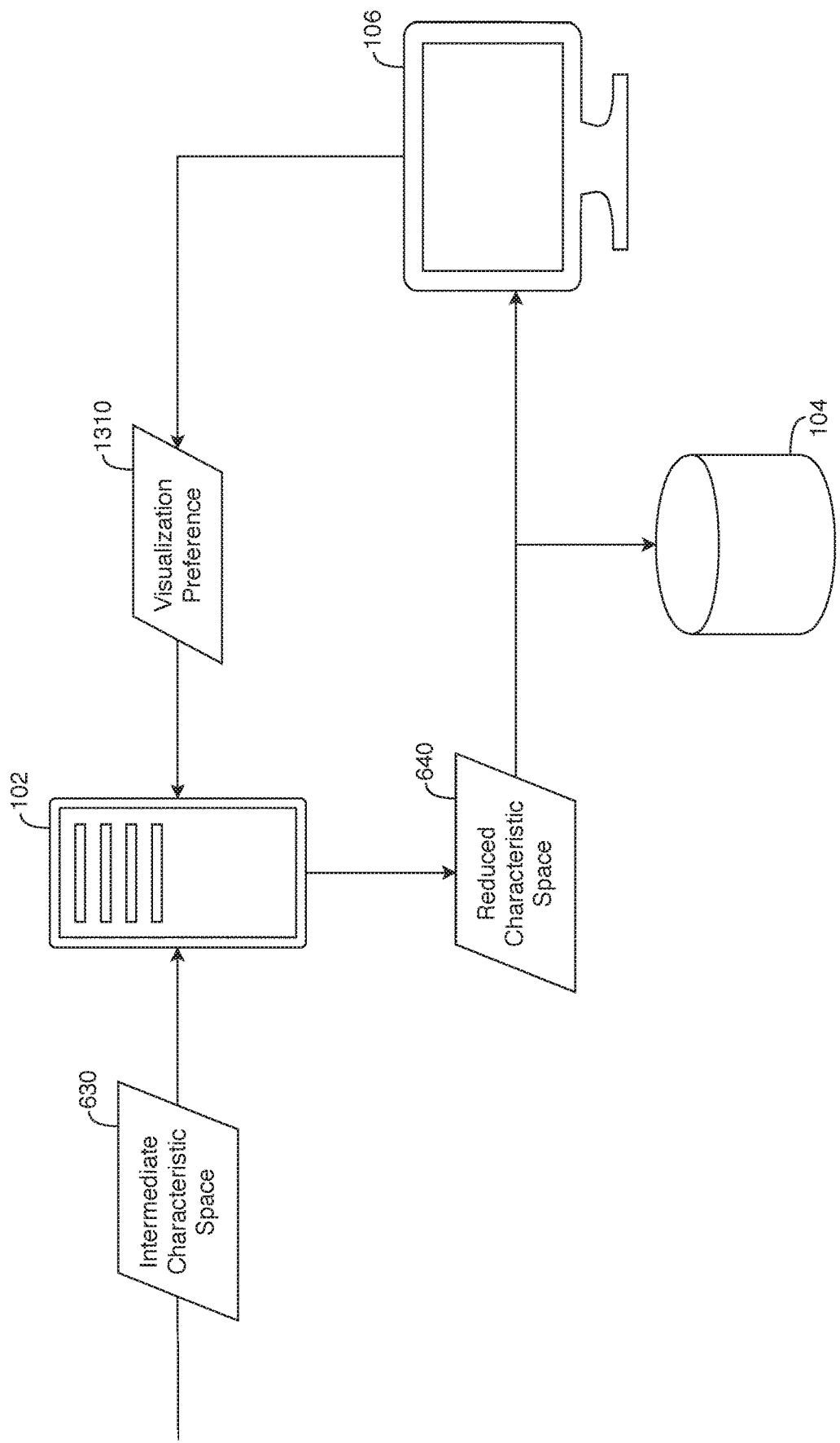
FIG. 13 depicts a data flow for generating and presenting a reduced characteristic space, according to one or more embodiments illustrated and described herein.

FIG. 13 depicts a data flow for generating and presenting a reduced characteristic space, according to one or more embodiments illustrated and described herein. As shown, computing device 102 receives a visualization preference 1310 from user terminal 106, which could include receiving a message from user terminal 106 that includes an indication of the visualization preference. Computing device 102 performs a non-linear dimensionality reduction on intermediate characteristic space 630 to obtain reduced characteristic space 640 having patent vectors with a number of features reduced to a third number of features selected based on visualization preference 1310. Computing device 102 may then present a visualization of the reduced characteristic space via a user interface (such as a user interface of user terminal 106), as will be described in additional detail below.

Visualization preference 1310 take the form of (or include or otherwise indicate) a number of dimensions to visualize, which in turn could be selected as the third number of features by computing device 102 at step 606. For instance, the non-linear dimensionality reduction may be performed at step 606 to obtain a reduced characteristic space that includes the patent vectors having a number of features reduced to the number of dimensions to visualize as indicated in visualization preference 1310. In some embodiments, the third number of features is a number of features between one and three, inclusive. For instance, the number of dimensions to visualize could be a number of dimensions that can be represented via a user interface, such as one dimension, two dimensions, or three dimensions, as examples.

Reduced characteristic space 640 obtained at step 606 may be saved to a data storage (such as a data storage of database 104), perhaps for further analysis. For instance, as illustrated in FIG. 13, computing device 102 may provide reduced characteristic space 650 to database 104 for storage by the database (e.g., by sending one or more messages over network 108 that include data representing that reduced characteristic space). Reduced characteristic space 640 could be stored as a table of the patent vectors of the reduced characteristic space, among other possibilities.

Referring again to FIG. 6, at step 608, system 100 presents a visualization of reduced characteristic space 640 via a user interface according to the visualization preference. The user interface could take the form of a user interface of user terminal 106, and presenting the visualization could include presenting a model representing reduced characteristic space 640 via the user interface of user terminal 106, as examples. The model could take the form of a low-dimensional model of reduced characteristic space 640, such as a one-dimensional, two-dimensional, or three-dimensional model of the reduced characteristic space, among other possibilities.

In an embodiment, the model has a number of dimensions equal to the number of dimensions of reduced characteristic space 640. For example, both the reduced characteristic space and the model may have two dimensions. In another embodiment, the model represents a mapping of the reduced characteristic space having a first number of dimensions to a model having a second number of dimensions less than the first number. For instance, the model may represent a mapping (e.g., a projection) of a three-dimensional reduced characteristic space to a two-dimensional image plane. In such an example, the model could take the form of one or more two-dimensional images representing respective angles of the three-dimensional reduced characteristic space, among numerous other examples.

Figure 14A:
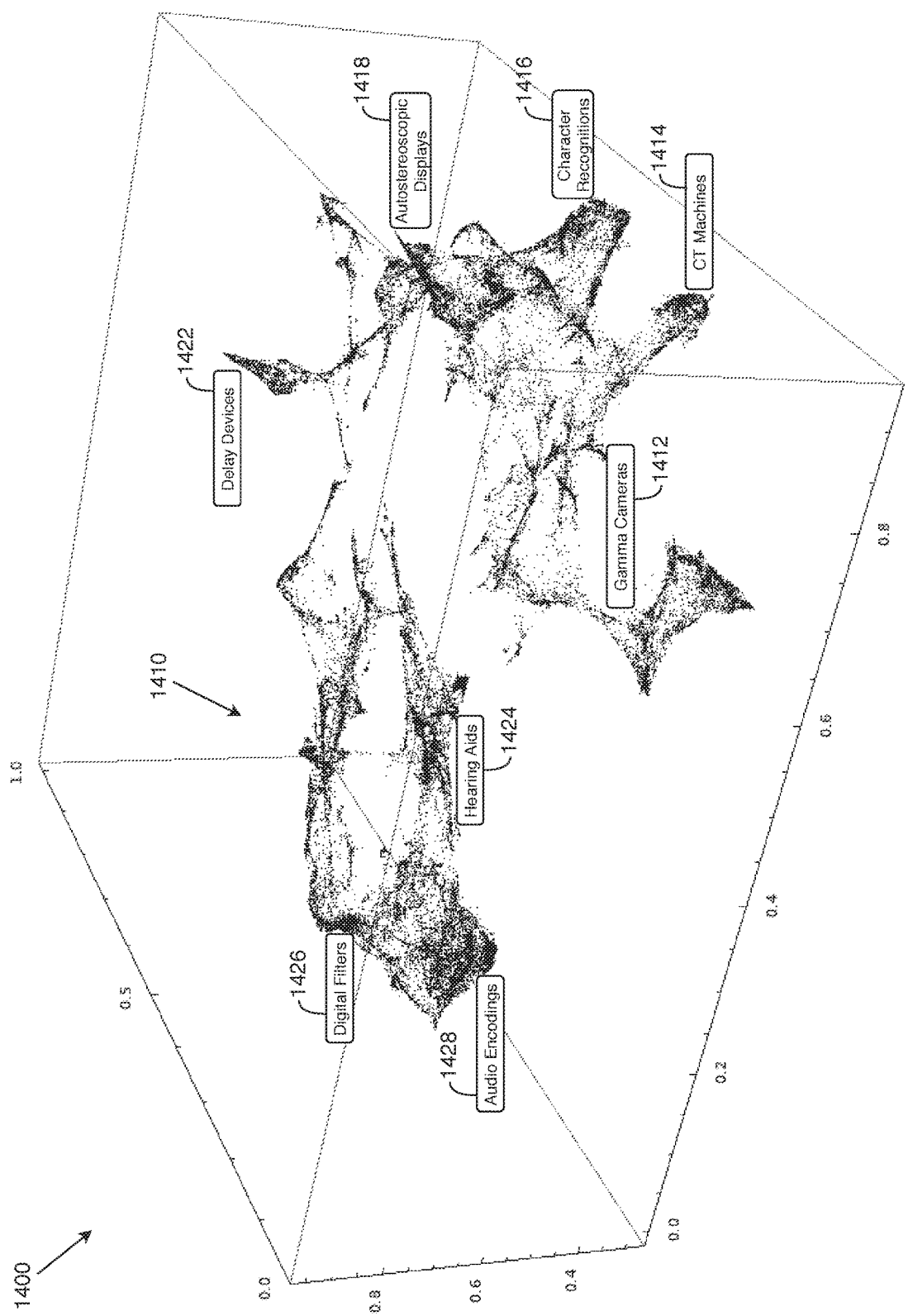
FIGS. 14a and 14b depict respective visualizations of a reduced characteristic space, according to one or more embodiments illustrated and described herein.

FIG. 14a depicts a visualization of a reduced characteristic space, according to one or more embodiments illustrated and described herein. As shown, a visualization 1400 is represented as a two-dimensional image of a three-dimensional reduced characteristic space, which in this example takes the form of reduced characteristic space 640 having patent vectors reduced to three features. Visualization 1400 includes a point cloud 1410, with each point representing a respective patent vector of reduced characteristic space 640 that in turn represents a respective patent family as described above, and further includes annotations 1412-1428. It should be understood, however, that visualization 1400 could take other forms as well, and that the visualization may not necessarily include a point cloud or annotations.

Annotations 1412-1428 may identify one or more properties of the patent families represented by the respective points in point cloud 1410. As an example, as shown in FIG. 14a, annotations 1412, 1414, 1416, 1418, 1422, 1424, 1426, and 1428 contain (respectively) the text of "Gamma Cameras," "CT Machines," "Character Recognitions," "Autostereoscopic Displays," "Display Devices," "Hearing Aids," "Digital Filters," and "Audio Encodings." The annotations may reflect the subject matter (such as an IPC classification or other patent classification) or other characteristic of part or all of the patent families represented by the respective points in a vicinity of the annotations (e.g., a cluster of patent vectors or points). For instance, as shown in FIG. 14a, annotation 1428 containing the text "Audio Encodings" is positioned in visualization 1400 in proximity to a high-density area of point cloud 1410, perhaps indicating that the patent families represented by the respective points in the high density area each have a patent classification of Audio Encodings or another patent classification similar to Audio Encodings.

Though FIG. 14a depicts a grayscale visualization of reduced characteristic space 640, in some embodiments, the points in point cloud 1410 may be presented with respective colors based on a similarity between respective patent vectors (or patent families represented by the patent vectors, which in turn may be based on a distance between respective patent vectors in the reduced characteristic space. For instance, the patent vectors may be classified into one or more clusters based on a similarity between the patent vectors in the cluster, and the points may have respective colors based on the clustering (e.g., such that the points in each cluster have a given color). Any of annotations 1412-1428 could represent one or more characteristics of the patent vectors in a given cluster (e.g., one or more properties such as properties p1 through p5).

Figure 14B:
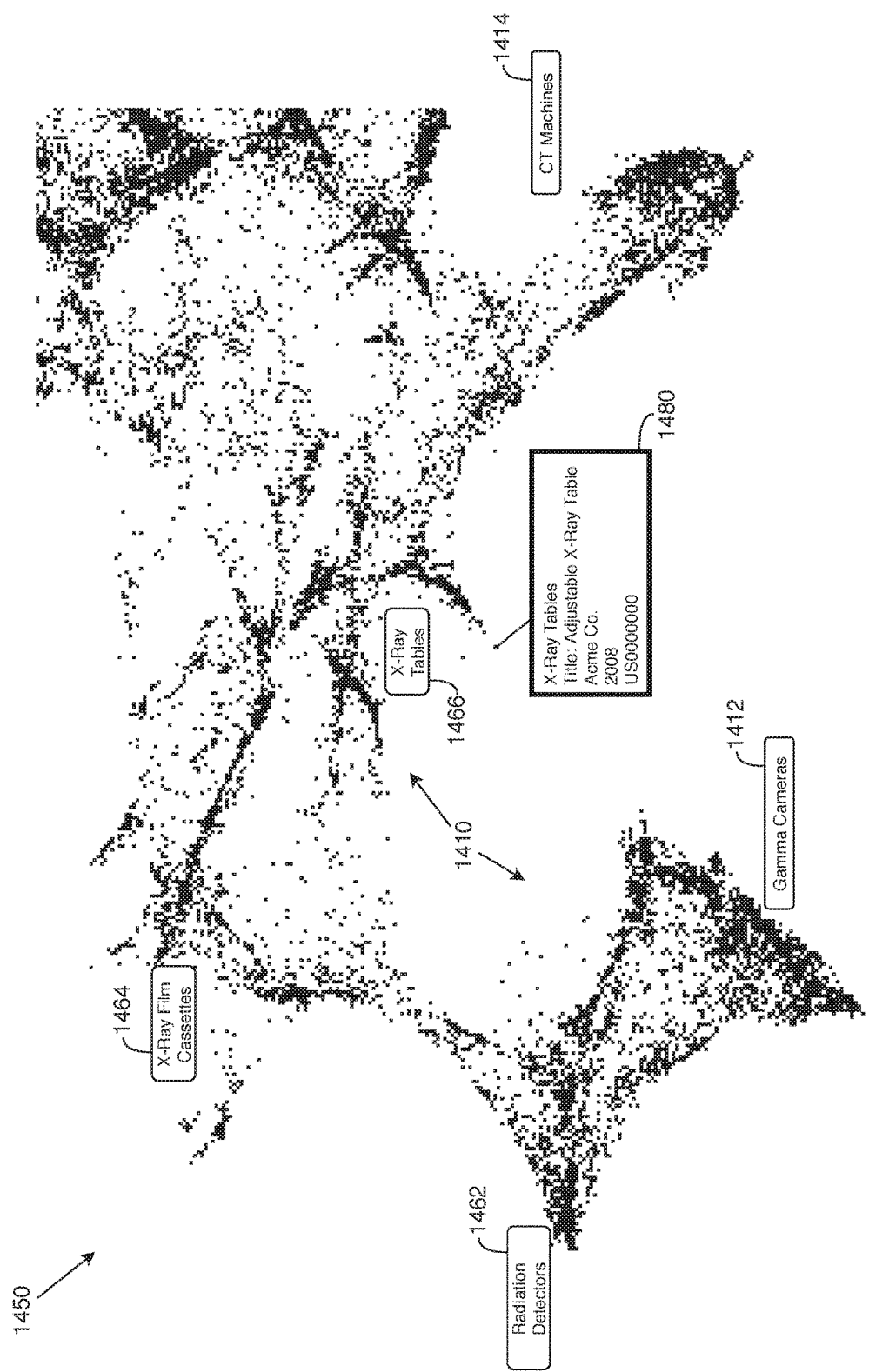

FIG. 14b also depicts a visualization of a reduced characteristic space, according to one or more embodiments illustrated and described herein. As shown, a visualization 1450 is represented as a two-dimensional image of reduced characteristic space 640 having patent vectors reduced to three features, and specifically, as an enlarged view (compared to visualization 1400) of a part of point cloud 1410. In addition to annotations 1412 and 1414 that are also part of visualization 1400, visualization 1450 includes annotations 1462, 1464, and 1466 containing (respectively) the text of "Radiation Detectors," "X-Ray Film Cassettes," and "X-Ray Tables," which are not among the annotations of visualization 1400. In the illustrated embodiment, visualization 1450 further includes a vector display 1480, which includes information (such as the properties) of the patent family represented by a given point (i.e., patent vector) in point cloud 1410. For instance, the vector display may identify a patent classification, a title, an assignee, a filing date, or a patent number of one or more patents in the represented patent family, such as the earliest priority patent common to all the patents in the patent family. Vector display 1480 could be presented in response to a selection of a given point in point cloud 1410 via a user interface-such as a user interface of user terminal 106.

Visualization 1400 (and/or visualization 1450) may be presented via a user interface such as that of user terminal 106—for example, by causing the user interface to present the visualization via a display of the user interface. In an embodiment, the visualization takes the form of an image of reduced characteristic space 640, and presenting the visualization includes presenting the image of the reduced characteristic space. The image could be a two-dimensional raster image, a one-dimensional raster image, or a three-dimensional hologram, as examples. As one possibility, presenting the image could include providing the image to user terminal 106 and causing the user terminal to present the image via the user interface. For example, computing device 102 could generate a raster image of reduced characteristic space 640 and provide the image to the user terminal for presentation via the user intreface. As another possibility, presenting the image could include providing data representing the visualization to the user interface (e.g., data representing reduced characteristic space 640), and causing the user interface to generate the image based on the provided data. For example, computing device 102 could provide data (e.g., patent vectors of reduced characteristic space 640) representing the visualization to user terminal 106, which in turn could generate a raster image of reduced characteristic space 640 (such as a projection of a three-dimensional space reduced characteristic space to a two-dimensional raster image). Presenting the raster image could include causing the user interface (e.g., user terminal 106 that includes a user interface) to present the provided or generated raster image via the user interface.

It should now be understood that embodiments described herein are directed to systems, computing devices, and methods for presenting a visualization of a low-dimensional patent characteristic space that includes representations of one or more patents. In some embodiments, a computing device generates a patent characteristic space including patent vectors having a first number of features. Each of the patent vectors represents a respective patent family of one or more respective patents, and each of the features represents a respective property of the respective patent families represented by the patent vectors. The computing device performs a linear dimensionality reduction on the patent characteristic space to obtain an intermediate characteristic space that includes the patent vectors having a number of features reduced to a second number of features selected based on the respective properties of the patent families. The computing device performs a non-linear dimensionality reduction on the intermediate characteristic space to obtain a reduced characteristic space that includes the patent vectors having a number of features reduced to a third number of features selected based on a visualization preference. The computing device presents a visualization of the reduced characteristic space via a user interface according to the visualization preference.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
   generating a patent characteristic space comprising patent vectors having a first number of features, each of the patent vectors representing a respective patent family of one or more respective patents, each of the features representing a respective property of the respective patent families represented by the patent vectors;
   performing a linear dimensionality reduction on the patent characteristic space to obtain an intermediate characteristic space that includes the patent vectors having a number of features reduced to a second number of features selected based on the respective properties of the patent families;
   performing a non-linear dimensionality reduction on the intermediate characteristic space to obtain a reduced characteristic space that includes the patent vectors having a number of features reduced to a third number of features selected based on a visualization preference; and
   presenting a visualization of the reduced characteristic space via a user interface according to the visualization preference.

2. The method of claim 1, wherein the properties of each of the patent families comprise a respective weighted classification value for a given patent classification, the weighted classification value comprising a sum of:
   one, if at least one of the patents in the patent family is assigned to the given patent classification,
   zero, if none of the patents in the patent family are assigned to the given patent classification, and
   a ratio of:
      a number of patents in the patent family that cite to a patent in another patent family having at least one patent assigned to the given patent classification, to
      a number of all patent families, other than the respective patent family, having a patent cited by at least one of the patents in the patent family.

3. The method of claim 1, further comprising selecting the second number of features, the selecting comprising:
   generating a frequency list of patent classifications according to respective frequencies of the patent classifications, the respective frequency of each of the patent classifications in the frequency list comprising a number of the patent families having at least one patent assigned to the patent classification;
   obtaining a count of patent classifications in the frequency list having respective frequencies that are no less than a threshold percent of the respective frequency of a patent classification having a highest respective frequency among the patent classifications in the frequency list; and
   selecting the second number of features based on the obtained count of patent classifications.

4. The method of claim 3, wherein:
   the threshold percent is fifteen percent, and
   selecting the second number of features based on the obtained count of patent classifications comprises selecting, as the second number of features, one more than the obtained count of patent classifications.

5. The method of claim 3, wherein selecting the second number of features based on the obtained count of patent classifications comprises selecting, as the second number of features, a number of features between ten and one hundred twenty, inclusive, based on the obtained count of patent classifications.

6. The method of claim 3, wherein the frequency list of patent classifications comprises at least one of an International Patent Classification (IPC), a Cooperative Patent Classification (CPC), a United States Patent Classification (USPC), and a German Patent Classification (DPK).

7. The method of claim 1, wherein the linear dimensionality reduction comprises a singular value decomposition (SVD) reduction or a principal component analysis (PCA) reduction.

8. The method of claim 1, wherein the non-linear dimensionality reduction comprises a Uniform Manifold Approximation and Projection (UMAP) reduction, a t-distributed stochastic neighbor embedding (t-SNE) reduction, or a multidimensional scaling (MDS) reduction.

9. The method of claim 1, wherein the third number of features comprises a number of features between one and three, inclusive.

10. A computing device comprising:
a processor; and
a non-transitory computer-readable storage medium comprising instructions that, when executed by the processor, cause the computing device to:
generate a patent characteristic space comprising patent vectors having a first number of features, each of the patent vectors representing a respective patent family of one or more respective patents, each of the features representing a respective property of the respective patent families represented by the patent vectors;
perform a linear dimensionality reduction on the patent characteristic space to obtain an intermediate characteristic space that includes the patent vectors having a number of features reduced to a second number of features selected based on the respective properties of the patent families;
perform a non-linear dimensionality reduction on the intermediate characteristic space to obtain a reduced characteristic space that includes the patent vectors having a number of features reduced to a third number of features selected based on a visualization preference; and
present a visualization of the reduced characteristic space via a user interface according to the visualization preference.

11. The computing device of claim 10, wherein the properties of each of the patent families comprise a respective weighted classification value for a given patent classification, the weighted classification value comprising a sum of:
one, if at least one of the patents in the patent family is assigned to the given patent classification,
zero, if none of the patents in the patent family are assigned to the given patent classification, and
a ratio of:
a number of patents in the patent family that cite to a patent in another patent family having at least one patent assigned to the given patent classification, to
a number of all patent families, other than the respective patent family, having a patent cited by at least one of the patents in the patent family.

12. The computing device of claim 10, wherein the instructions further cause the computing device to:
generate a frequency list of patent classifications according to respective frequencies of the patent classifications, the respective frequency of each of the patent classifications in the frequency list comprising a number of the patent families having at least one patent assigned to the patent classification;
obtain a count of patent classifications in the frequency list having respective frequencies that are no less than a threshold percent of the respective frequency of a patent classification having a highest respective frequency among the patent classifications in the frequency list; and
select, as the second number, a number of features based on the obtained count of patent classifications.

13. The computing device of claim 12, wherein:
the threshold percent is fifteen percent, and
the instructions selecting the second number of features based on the obtained count of patent classifications instructions that cause the computing device to select, as the second number of features, one more than the obtained count of patent classifications.

14. The computing device of claim 12, wherein the instructions to select the second number of features based on the obtained count of patent classifications comprise instructions that cause the computing device to select, as the second number of features, a number of features between ten and one hundred twenty, inclusive, based on the obtained count of patent classifications.

15. A method comprising:
generating a patent characteristic space comprising patent vectors having a first number of features, each of the patent vectors representing a respective patent family of one or more respective patents, each of the features representing a respective property of the respective patent families represented by the patent vectors;
performing a linear dimensionality reduction on the patent characteristic space to obtain an intermediate characteristic space that includes the patent vectors having a number of features reduced to a second number of features selected based on the respective properties of the patent families;
generating a frequency list of patent classifications according to respective frequencies of the patent classifications, the respective frequency of each of the patent classifications in the frequency list comprising a number of the patent families having at least one patent assigned to the patent classification;
obtaining a count of patent classifications in the frequency list having respective frequencies that are no less than a threshold percent of the respective frequency of a patent classification having a highest respective frequency among the patent classifications in the frequency list;
performing a linear dimensionality reduction on the intermediate characteristic space to obtain a reduced characteristic space that includes the patent vectors having a number of features reduced to a third number of features selected based on the obtained counted of patent classifications; and
presenting a visualization of the reduced characteristic space via a user interface according to a visualization preference.

16. The method of claim 15, wherein:
the threshold percent is fifteen percent, and
a number of features equal to one more than the obtained count of patent classifications is selected as the third number of features.

17. The method of claim 15, wherein a number of features between ten and one hundred twenty, inclusive, is selected as the third number of features.

18. The method of claim 15, wherein the frequency list of patent classifications comprises at least one of an International Patent Classification (IPC), a Cooperative Patent Classification (CPC), a United States Patent Classification (USPC), and a German Patent Classification (DPK).

19. The method of claim 15, wherein the properties of each of the patent families comprise a respective weighted classification value for a given patent classification, the weighted classification value comprising a sum of:
one, if at least one of the patents in the patent family is assigned to the given patent classification,
zero, if none of the patents in the patent family are assigned to the given patent classification, and a ratio of:
> a number of patents in the patent family that cite to a patent in another patent family having at least one patent assigned to the given patent classification, to
> a number of all patent families, other than the respective patent family, having a patent cited by at least one of the patents in the patent family.

20. The method of claim 15, wherein the non-linear dimensionality reduction comprises a Uniform Manifold Approximation and Projection (UMAP) reduction, a t-distributed stochastic neighbor embedding (t-SNE) reduction, or a multidimensional scaling (MDS) reduction.

\* \* \* \* \*